US012387038B2

(12) United States Patent
Schuck et al.

(10) Patent No.: US 12,387,038 B2
(45) Date of Patent: Aug. 12, 2025

(54) SYSTEMS AND METHODS OF GENERATING A DESIGN BASED ON A USER SEARCH QUERY

(71) Applicant: Canva Pty Ltd, Surry Hills (AU)

(72) Inventors: Adam Schuck, Sydney (AU); William Radford, Sydney (AU); Cameron Adams, Rozelle (AU); Melanie Joy Perkins, Sydney (AU)

(73) Assignee: CANVA PTY LTD, Surrey Hills (AU)

( * ) Notice: Subject to any disclaimer, the term of this patent is extended or adjusted under 35 U.S.C. 154(b) by 18 days.

(21) Appl. No.: 17/620,939

(22) PCT Filed: Jun. 26, 2020

(86) PCT No.: PCT/AU2020/050651
§ 371 (c)(1),
(2) Date: Dec. 20, 2021

(87) PCT Pub. No.: WO2020/257862
PCT Pub. Date: Dec. 30, 2020

(65) Prior Publication Data
US 2022/0327282 A1    Oct. 13, 2022

Related U.S. Application Data

(60) Provisional application No. 62/868,104, filed on Jun. 28, 2019.

(51) Int. Cl.
*G06F 40/106* (2020.01)
*G06F 40/186* (2020.01)
(Continued)

(52) U.S. Cl.
CPC .......... *G06F 40/186* (2020.01); *G06F 40/106* (2020.01); *G06F 40/205* (2020.01); *G06T 11/60* (2013.01)

(58) Field of Classification Search
CPC .... G06F 40/186; G06F 40/205; G06F 40/106; G06T 11/60
See application file for complete search history.

(56) References Cited

U.S. PATENT DOCUMENTS 9,396,235 B1 * 7/2016 Wald ................. G06F 16/90332
10,013,403 B2 * 7/2018 Masuko ............... G06F 40/169
(Continued)

OTHER PUBLICATIONS

International Search Report and Written Opinion for PCT/AU2020/050651 mailed Aug. 17, 2020.

*Primary Examiner* — Scott T Baderman
*Assistant Examiner* — Mario M Velez-Lopez
(74) *Attorney, Agent, or Firm* — GrowIP Law Group LLC

(57) ABSTRACT

An apparatus includes network interface and a processor. The network interface is configured to receive first user input indicating a first search query. The processor is configured to identify one or more first keywords by parsing the first search query, to select a first design template based on the one or more first keywords, and to select first design content based on the one or more first keywords. The first design content includes at least one of a first font, a first fill, or a first image. The processor is also configured to generate a first design based on the first design template and to update the first design based on the first design content. The processor is configured to generate a first graphical user interface (GUI) including a first design image of the first design and to provide the first GUI via the network interface to a client device.

18 Claims, 11 Drawing Sheets

(51) Int. Cl.
    *G06F 40/205*     (2020.01)
    *G06T 11/60*     (2006.01)

(56) References Cited

U.S. PATENT DOCUMENTS

| | | | |
|---|---|---|---|
| 10,140,392 | B1 | 11/2018 | Bowen |
| 10,157,408 | B2 | 12/2018 | Varley |
| 11,720,942 | B1 * | 8/2023 | Bazzani ............. G06Q 30/0613 705/26.41 |
| 2005/0104897 | A1 * | 5/2005 | Walker ................. H04N 1/3873 345/620 |
| 2005/0122543 | A1 * | 6/2005 | Walker ................... H04N 1/622 358/1.18 |
| 2009/0147297 | A1 * | 6/2009 | Stevenson ............... G06T 11/60 358/1.15 |
| 2009/0327875 | A1 * | 12/2009 | Kinkoh ................. G06F 40/186 715/255 |
| 2010/0114691 | A1 * | 5/2010 | Wu .................... G06Q 30/0246 707/E17.014 |
| 2010/0235338 | A1 * | 9/2010 | Gabriel ............ G06F 16/24578 707/706 |
| 2013/0124547 | A1 * | 5/2013 | Kasterstein ....... H04M 1/72427 715/810 |
| 2019/0043231 | A1 * | 2/2019 | Uzgin ................. G06F 3/04845 |
| 2021/0342338 | A1 * | 11/2021 | Nocedal De La Garza ................ G06F 3/0488 |
| 2022/0222418 | A1 * | 7/2022 | Ziraknejad .......... G06F 21/6218 |

\* cited by examiner

SYSTEMS AND METHODS OF GENERATING A DESIGN BASED ON A USER SEARCH QUERY

CROSS-REFERENCE TO RELATED APPLICATIONS

This application claims the benefit of the filing date of International PCT Patent Application No. PCT/AU2020/050651, filed on Jun. 26, 2020, that claims priority to U.S. Provisional Patent Application No. 62/868,104, filed on Jun. 28, 2019, both of which are hereby incorporated by reference in their entirety.

BACKGROUND

With the proliferation of design tools, there is increasing use of templates to generate designs. Typically, a user selects categories or provides keywords to search for pre-existing templates. The user selects a template from the search results and adds user content. The pre-existing templates are generally based on common design practices and may not closely match the keywords provided by the user. Providing the keywords initially to search for a template and then adding user content to more closely match the initially provided keywords is repetitive, time-consuming, and requires user effort to search for content.

DETAILED DESCRIPTION

Figure 1:
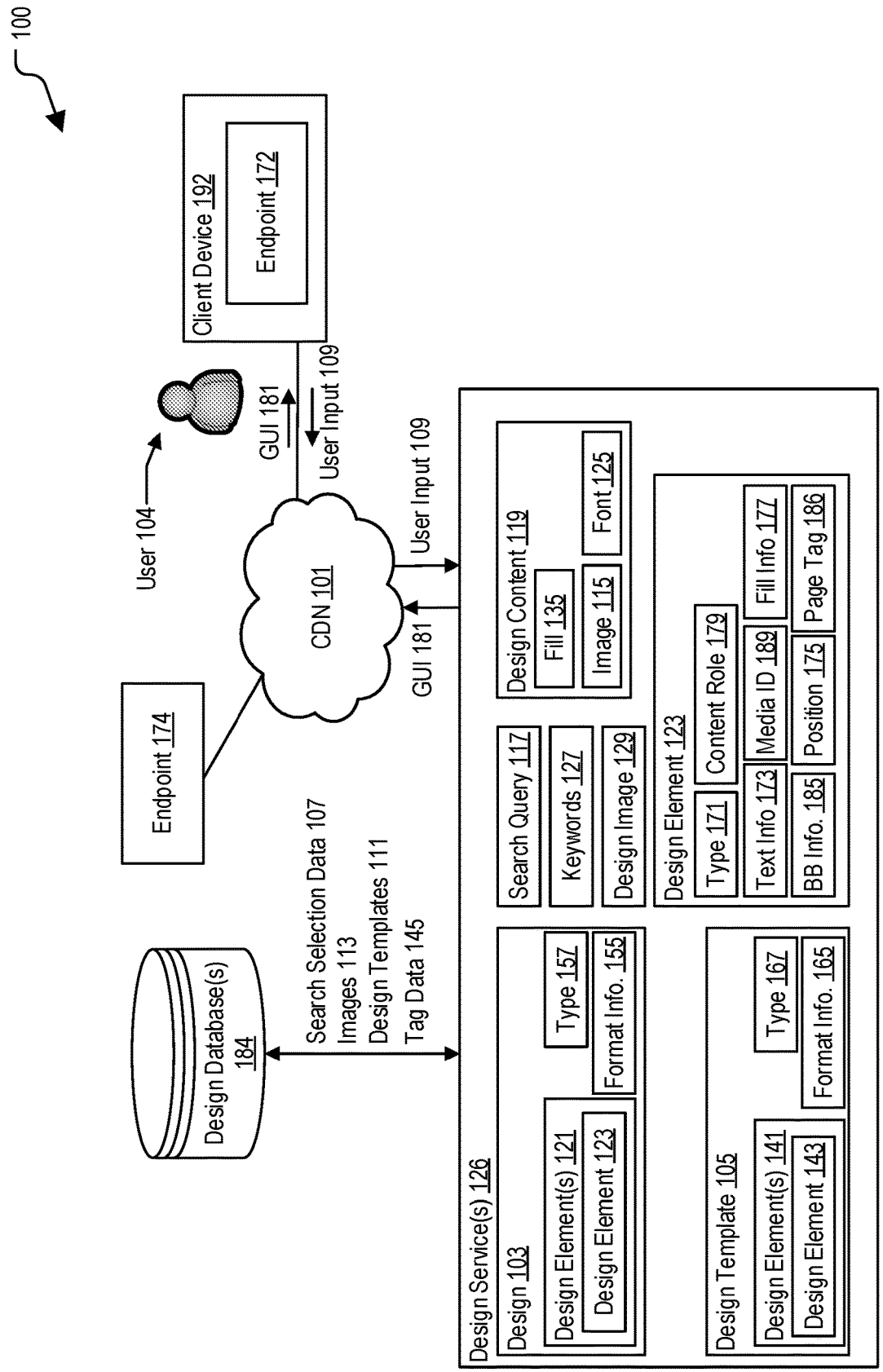
FIG. 1 illustrates a particular example of a system that is operable to generate a design based on a user search query.

Design templates are a popular way to generate graphic designs, e.g., for websites, brochures, invitations, etc. In accordance with particular embodiments of the present disclosure, a user provides a search query by typing into a search field. The search query indicates what the user would like to create (e.g., "a red invitation"). One or more keywords (e.g., "red", "invitation", and "red invitation") are identified by parsing the search query (e.g., "a red invitation"). A design template (e.g., an invitation template) is selected based on the keywords. As used herein, a "template" includes a default layout of images, text, colors, and/or fonts. For example, a placeholder template includes text elements that are placed on a white background. In a particular aspect, the layout of the text elements is based on a type of the template. For example, an Instagram® (a registered trademark of Instagram LLC, Menlo Park, CA) post template includes a pre- title text element that includes default pre-title text (e.g., "Tap to add a pre-title (optional)"), a title text element that includes default title text (e.g., "Tap to add text"), and a subtitle text element that includes default subtitle text (e.g., "Tap to add a subtitle (optional)").

The design template (e.g., an invitation template) is used to generate a design. As used herein, a "design" includes one or more design elements and format information (e.g., color information, font type, font size, etc.). A "design element" includes image content (e.g., in vector format or pixel format), text content, fill content, etc. In a particular aspect, the format information includes first format information corresponding to a first design element type (e.g., a title text element). For example, the first format information (e.g., default format information) indicates color information, font type, font size, etc. associated with design elements of the first design element type. In a particular aspect, the first format information indicates default format information that is used to format a first design element of the first design element type that is added to the design. Thus, the format information may cause a "title" design element to have a different font face and size than other types of design elements.

In a particular aspect, the design elements include one or more attributes. For example, the first design element includes second format information, one or more additional attributes, or a combination thereof. In a particular aspect, a user updates a format of the first design element and the second format information indicates the updated format of the first design element. In a particular aspect, the second format information overrides the first format information (e.g., the default format information) for the first design element. For example, the first design element is formatted based on the second format information. To illustrate, an invitation template may have red title text by default and the user may change the title text of a first title element of an invitation to blue. If the user adds a second title element to the invitation, the second title element has red title text by default (as indicated by the first format information) while the first title element keeps the blue title text (as indicated by the second format information of the first title element).

Generating the design based on the design template includes adding second design elements to the design that correspond to first design elements of the design template. For example, an image element is added to the design based on determining that the design template includes an image element. An image (e.g., a cupcake image) from the image element of the design template is copied to the image element of the design.

Design content is selected based on the keywords (e.g., "red", "invitation", and "red invitation") and the design is updated based on the selected design content. For example, a red fill element is selected based on the keywords (e.g., "red" and "red invitation"). The design is updated to have a red fill element as a background element. A design image of the design may be provided to a display. The user can select the design image to view or edit the design.

Updating the design based on the keywords enables the design to be customized based on the search query without the user having to provide additional input. For example, the design is updated automatically based on the search query prior to presenting a design to the user and prior to the user having a chance to modify a presented design. The user is saved time and effort by having the design automatically modified to more closely match what the user is planning to do. The ability to customize the design based on the keywords expands the available design options. As an illustrative example, three design templates including one image each can be used to automatically generate at least nine designs. For example, a first design, a second design, and a third design can be generated by adding a first image, a second image, and a third image, respectively, to a first design template. Additional illustrative, non-limiting advantages of the present disclosure are described herein.

In the following description, certain aspects of the present disclosure are described in conjunction with a graphic design website that enables users to create designs using web application(s) or other Software-as-a-service (SaaS) components. Examples of graphic designs include, but are not limited to, social media posts or headers, presentations, letterheads, magazine templates, certificates, resumes, flyers, book/album covers or art, infographics, flyers, posters, menus, business cards, brochures, logos, greeting cards, postcards, invitations, collages, announcements, blog graphics, Internet advertisements, videos, animations, etc. In some examples, the graphic design website can be accessed by using Internet browsers and/or an application installed on a mobile device, such as a mobile phone or tablet. Unless specified otherwise, reference to the "graphic design website" herein includes the graphic design web application(s)/SaaS component(s) accessible via the graphic design website. Use of the graphic design website to create designs may be faster and/or more convenient than using a standalone downloaded/purchased software program. However, it is to be understood that the description of website-based aspects herein is for illustration only and is not to be considered limiting. In alternative implementations, the techniques of the present disclosure may be applied in the context of a standalone computer application executed on a desktop computer, a laptop computer, a mobile device, etc. A "user" can refer to an internal user or an external user of the graphic design website. For example, an internal user includes a designer, an employee, a software engineer, or another person that manages or designs the graphic design website. An external user includes a person that is not an internal user, such as someone that accesses the graphic design website to generate designs and does not manage or design the graphic design website. In a particular aspect, one or more operations described herein with reference to a user can be performed by a first user (e.g., an internal user) and one or more operations described herein with reference to the user can be performed by a second user (e.g., an external user).

When a user provides a search query (e.g., "a holiday card with a puppy") on the graphic design website, a new design (e.g., a first design) is generated based on a blank design (e.g., a placeholder template) or a design template that has a pre-applied layout. For example, the graphic design website may have access to several "holiday greeting card" templates, and may select one of the templates as a starting point from which to customize a holiday greeting card based on keywords of the search query. In a particular example, a design template (e.g., a holiday card template) is selected based on one or more of the keywords (e.g., "holiday card") of the search query and a first design (e.g., a holiday card design) is generated based on the design template. Design content (e.g., an image of a puppy) is selected based on one or more of the keywords (e.g., "puppy") of the search query. The first design (e.g., the holiday card design) is updated based on the design content. For example, the first design includes an image (e.g., a default image) copied from the design template (e.g., the holiday card template). The first design is updated to replace the default image with the selected image (e.g., the puppy image).

The user may edit (e.g., further customize) the first design by uploading photos of their own family, entering a personalized greeting message, changing the images/text/fonts/colors, etc. To provide a more comprehensive design experience, the graphic design website may enable the user to search for images, templates, fonts, etc., as described above. To illustrate, the user may enter the search term "dog" to search for stock images of dogs that can be inserted into a design. Incorporating a search result image (e.g., a photo of a dog) into a design may be as simple as "dragging-and-dropping" the image into the design, at which point the user may be free to edit the image in terms of size, color, etc. Certain media assets (e.g., images, templates, fonts, etc.) may be free to incorporate into designs while others may be available for a price and may have an associated license (e.g., a one-time-use license) that is enforced by the graphic design website.

The graphic design website generates a graphical user interface (GUI) including a first design image of the first design. The graphic design website provides the GUI to a display. In a particular aspect, the user can select the first design image to edit the first design. For example, the graphic design websites update the GUI to include one or more options for editing the first design, an option to save the design, one or more options to publish the design, or a combination thereof.

An illustrative example of a system that supports operation of such a graphic design website and that is operable to generate a design based on a user search query is shown in FIG. 1 and is generally designated 100. The system 100 includes a client device 192 that is communicably coupled, via a content delivery network (CDN) 101, to a computing environment (e.g., a network-accessible cloud computing environment). For example, the client device 192 is communicatively coupled to one or more design service(s) 126 of the computing environment. In a particular aspect, the design service(s) 126 correspond to one or more services or components described with reference to FIG. 10, one or more additional services or components, or a combination thereof. Although FIG. 1 shows a CDN 101, it is to be understood that in alternative aspects devices shown in FIG. 1 may communicate using one or more networks (or portions thereof) that include but are not limited to CDN(s), private network(s), cellular network(s), the Internet, etc. The client device 192 is configured to be operated by a user 104. As further described herein, the system 100 may enable the user 104 to quickly and easily create and edit various forms of graphic designs and other visual media works, even if the user 104 is not a trained graphic designer or other visual arts professional. In some examples, the computing environment includes one or more servers and/or one or more databases, data stores, and/or data storage devices. For example, the computing environment includes one or more design database(s) 184. In a particular aspect, the design database(s) 184 correspond to one or more databases or components described with reference to FIG. 10, one or more additional databases or components, or a combination thereof. The computing environment may include one or more load balancers, as further described with reference to FIG. 10.

In particular aspects, the client device 192 corresponds to a desktop computer, a laptop computer, a mobile phone, a tablet, or other computing device configured to access websites via the Internet. The client device 192 may include (or may be connected to) one or more input devices (e.g., a keyboard, a mouse, a touchscreen, etc.) and one or more output devices (e.g., a monitor, a touchscreen, audio speakers, a headphone connection, etc.).

In particular aspects, the client device 192, the computing environment, the one or more servers, the design database(s) 184, the load balancers, or a combination thereof, as further described with reference to FIG. 10, may include one or more processors or processing logic, memories, and/or network interfaces. The memories may include instructions executable by the processors to perform various functions as described herein. The network interfaces may include wired and/or wireless interfaces operable to enable communication to local area networks (LANs) and/or wide area networks (WANs), such as the Internet.

A first server may be configured to execute a web front end. The web front end is configured to serve a graphic design website to requestors. For example, the web front end may send one or more graphical user interfaces to the client device 192 in response to receiving a request from the client device 192. The same or a different (e.g., second) server may be configured to execute a design service(s) 126. The design service(s) 126 may enable core design creation, design updating, and design deletion functionality of the graphic design website. The same or a different (e.g., third) server may be configured to execute an export service. The export service may support graphic design export tasks (e.g., publishing a design as a web output).

The load balancers may be configured to send a message to a server requesting instantiation of a particular service. The server may execute a virtual machine including an instance of the particular service. For example, the load balancers may be configured to send a message to the second server to instantiate the design service(s) 126. The second server may, in response to receiving the message, execute a virtual machine including an instance of the design service(s) 126. In a particular aspect, multiple servers may execute instances of the same service. For example, the load balancers may send a second message to a fourth server to instantiate the design service(s) 126. In this example, the second server may execute a first virtual machine executing a first instance of the design service(s) 126 and the fourth server may execute a second virtual machine including a second instance of the design service(s) 126.

The design service(s) 126, the export service, or both, may be coupled to one or more endpoints. In FIG. 1, the design service(s) 126, the export service, or both may be coupled, via the CDN 101, to an endpoint 172, an endpoint 174, one or more additional endpoints, or a combination thereof. An "endpoint" may also be included in the client device 192. For example, the client device 192 may include the endpoint 172. An endpoint may refer to an application, a server, a social network site, a web server, a device, or a combination thereof.

Figure 2:
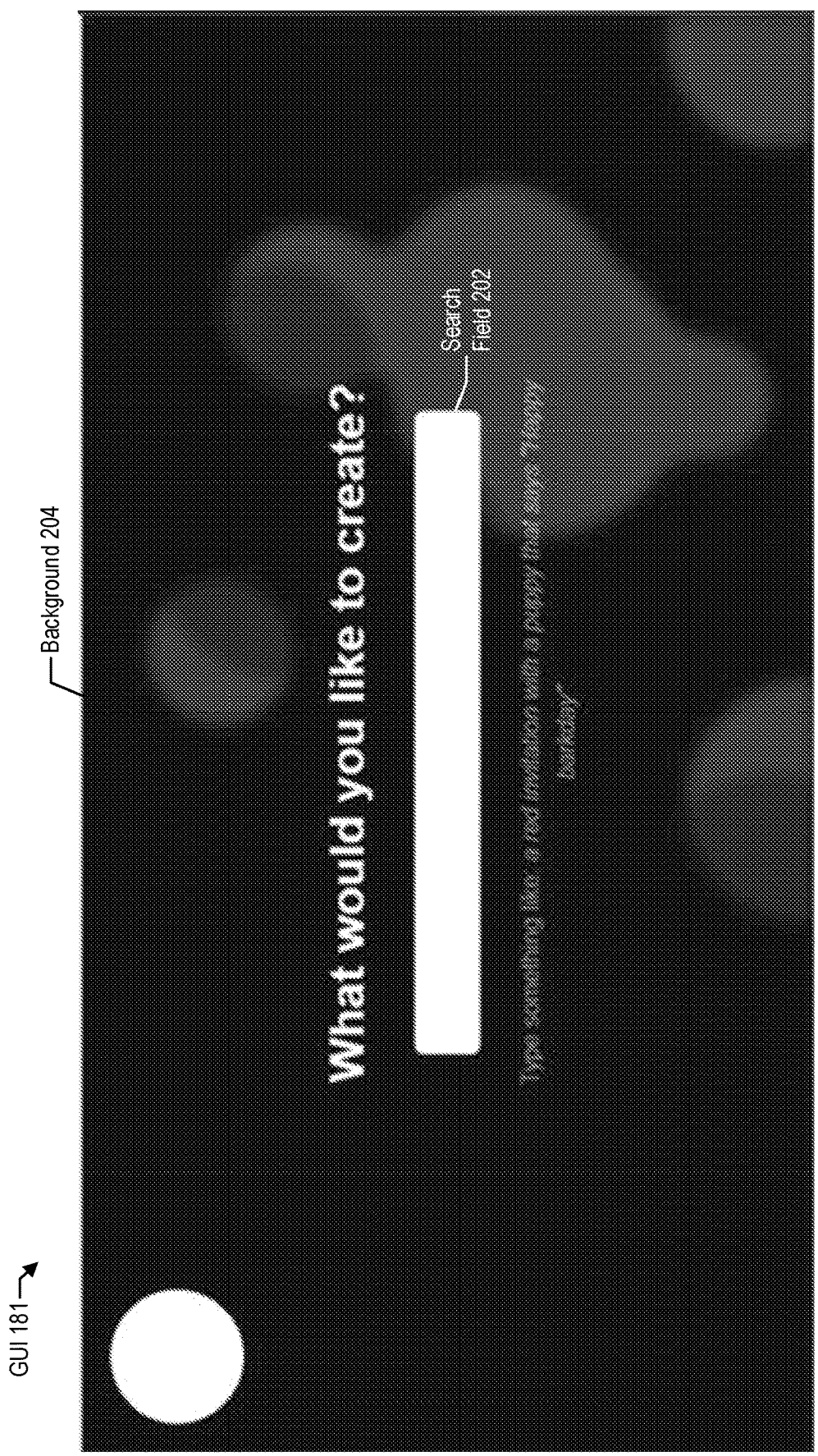
FIG. 2 illustrates a particular example of a user interface that may be generated by the system of FIG. 1.

During operation, the user 104 may operate the client device 192 to access a graphic design website via the computing environment. The graphic design website may enable the user to create and modify a design 103 (which may be persisted to a document database, as further described with reference to FIG. 10) using web application(s) and/or Software-as-a-service components presented by the graphic design website. For example, the web front end may generate a graphical user interface (GUI) 181 of the graphic design website. The user 104 may use the GUI 181 to create and modify the design 103. Turning to the example illustrated in FIG. 2, the GUI 181 includes a search field 202 (e.g., a text field) and a background 204. In a particular aspect, the background 204 includes a default background image. The user 104 provides the user input 109 by typing in the search field 202. It should be understood that typing is provided as illustrative example of providing the user input 109. In other examples, the user 104 provides the user input 109 in other ways, including but not limited to, audio input, video input, image input, other type of sensor input, or a combination thereof. In a particular example, the user 104 provides the user input 109 by speaking into a microphone of a mobile device. The mobile device includes a speech-to-text engine that generates text based on an audio signal and updates the search field 202 based on the text.

Figure 3:
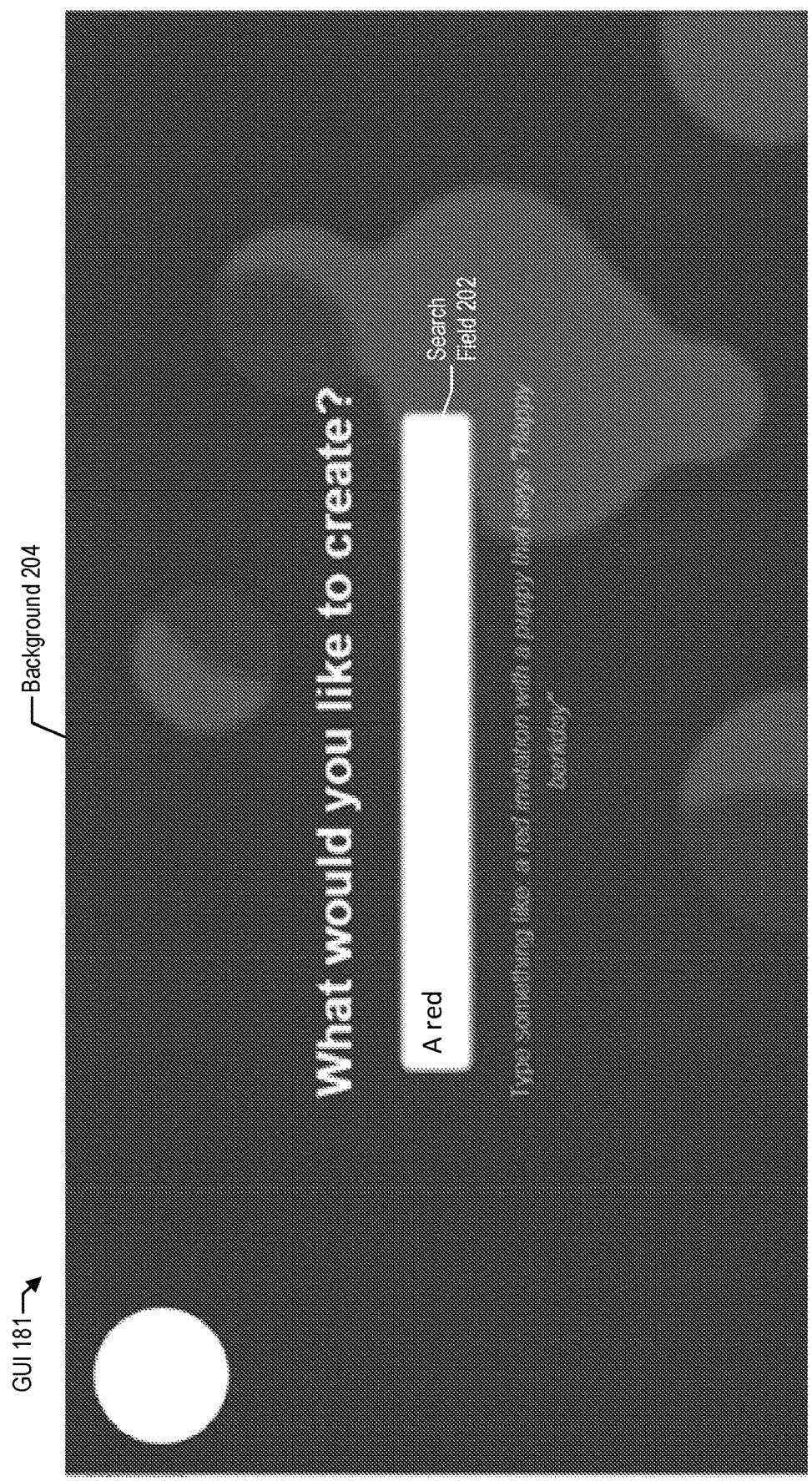
FIG. 3 illustrates a particular example of a search query received via a user interface of the system of FIG. 1.

In the example illustrated in FIG. 3, the user 104 enters (e.g., by typing, speaking, movement, etc.) first text (e.g., "A red") in the search field 202. In a particular example, the design service(s) 126 processes the user input 109 as each character or word is entered in the search field 202. In an alternative example, the GUI 181 includes a send option (not illustrated) and the design service(s) 126 processes the user input 109 of the search field 202 in response to receiving a selection of the send option. The user input 109 indicates a search query 117 (e.g., "A red"). The design service(s) 126 generates one or more keywords 127 (e.g., "red") by parsing the search query 117. The design service(s) 126 determines whether the keywords 127 indicate a design template type (e.g., a greeting card, an invitation, an Instagram® post, etc.). The design service(s) 126 refrains from generating the design 103 in response to determining that the keywords 127 (e.g., "red") do not indicate any design template type.

In a particular aspect, the design service(s) 126 updates the background 204 in response to determining that the keywords 127 (e.g., "red") indicate a color. For example, the design service(s) 126 updates the background 204 to have the color (e.g., "red") indicated by the keywords 127. To illustrate, the design service(s) 126 updates the background 204 by applying a first filter (e.g., a red filter) to the background 204. Updating the background 204 based on the keywords 127 (e.g., "red") may signal to the user 104 that the design service(s) 126 is actively processing (e.g., in real-time) the user input 109 provided by the user 104 via the search field 202.

The user 104 may continue to enter input (e.g., type) in the search field 202. In the example illustrated in FIG. 4, the search field 202 indicates an updated version of the search query 117 (e.g., "A red invitation"). The design service(s) 126 identifies the keywords 127 (e.g., "red", "invitation", and "red invitation") by parsing the search query 117 (e.g., "A red invitation"). In a particular aspect, design template mapping data indicates keywords corresponding to each design template type. For example, the design template mapping data indicates that a first keyword (e.g., "invitation") matches a particular design template type (e.g., an invitation design template type). The design service(s) 126, in response to determining that the keywords 127 include the first keyword, determines that the keywords 127 indicate the particular design template type (e.g., an invitation design template). The design service(s) 126 selects a design template 105 from design templates 111 based on the keywords 127. For example, the design service(s) 126 selects the design template 105 in response to determining that a type 167 of the design template 105 indicates the particular design template type (e.g., indicated by the first keyword).

In a particular example, the design service(s) 126 retrieves tag data 145 from the design database(s) 184. The tag data 145 includes one or more template tags associated with the design template 105. For example, the one or more template tags include a cupcake image tag, a dessert image tag, a food image tag, a berry image tag, a frosting image tag, or a combination thereof, indicating a type of image included in the design template 105. In a particular example, the one or more template tags include an event tag (e.g., a 16th birthday tag) indicating that the design template 105 is associated with a particular event (e.g., a 16th birthday). The one or more template tags include color tags (e.g., a red tag, a white tag, a brown tag, or a combination thereof) indicating colors of design elements included in the design template 105. In a particular aspect, the color tags indicate colors that can be assigned to design elements of the design template 105. For example, a color tag indicates that a background element of the design template 105 can have any color. As another example, a color tag (e.g., a bright-color family tag) indicates that a background element of the design template 105 can have any color in a color family (e.g., a bright-color family) For example, a bright-color family includes bright shades of red, blue, and green, and does not include pastel colors. In a particular example, the color tag (e.g., any-color-except-blue) indicates that a background element of the design template 105 can have any color except a particular color that is included in a foreground element (e.g., blue text). In a particular aspect, the design service(s) 126 selects the design template 105 based at least in part on determining that at least one of the template tags (e.g., a red tag, an any-color tag, a bright-color family tag, or an any-color-except-blue tag) of the design template 105 "matches" at least one of the keywords 127 (e.g., "red"). As used herein, "match" is not limited to an identical word to word correspondence. As an example, a "red" keyword can match a red tag, an any- color tag, a bright-color family tag, or an any-color-except-blue tag.

In a particular aspect, the design service(s) 126 identifies the design templates 111 based on the keywords 127. For example, one or more of the design templates 111 may have a design template type (e.g., a party template, a birthday template, an invitation template, an event template, or a card template) that matches one or more of the keywords 127 (e.g., "invitation"). The design service(s) 126 determines scores of the design templates 111 based on the keywords 127. For example, the design service(s) 126 determines a first score of the design template 105 based on a count of the first template tags of the design template 105 that match at least one of the keywords 127. In a particular aspect, the design service(s) 126 retrieves search selection data 107 from the design database(s) 184. The search selection data 107 indicates that a second design was saved by a second user at a first time, and further indicates that the second design was based on a second search query and the design template 105. In a particular aspect, the design service(s) 126 determines, at a second time, the first score based at least in part on a comparison of the first time and the second time, a comparison of the search query 117 and the second search query, a comparison of the first user characteristics of the user 104 (e.g., a logged-in user) and second user characteristics of the second user, or a combination thereof. In a particular example, the first score increases with the recency that the second design based on the same design template was saved (e.g., a difference between the first time and the second time is less than a threshold). In a particular example, the first score is higher if the same design template was used to generate the second design responsive to a common search query terms and the second design was saved by a user (e.g., a count of common keywords associated with the search query 117 and the second search query is greater than a threshold). In a particular example, the first score is higher if the second design is based on the same design template and if the second design was saved by a user having common characteristics as the user 104 (e.g., a count of common characteristics associated with the user 104 and the second user is greater than a threshold). In a particular aspect, the first score increases based on a count of the common characteristics. User characteristics may include age, location, gender, occupation, ethnicity, hobbies, interests, social group membership, music preferences, reading preferences, web browsing preferences, location history, food preferences, or a combination thereof. As an illustrative example, the first score is calculated in manner that increases a likelihood of selecting a particular design template that is recently popular among users having similar characteristics as the user 104. In a particular aspect, the design service(s) 126 selects the design template 105 based on determining that the first score satisfies (e.g., is greater than) a score threshold (e.g., 0), that the first score is highest among the scores of the design templates 111, or both. In a particular aspect, the design service(s) 126 refrains from using personally identifiable information of other users to select design templates for the user 104. In a particular aspect, the design service(s) 126 may select design templates for the user 104 based on personally identifiable information of other users only with explicit consent of the other users.

The design service(s) 126 generates the design 103 based on the design template 105. For example, the design template 105 includes one or more design element(s) 141, format information 165, the type 167, or a combination thereof. The design service(s) 126 generates the design 103 including one or more design element(s) 121 corresponding to the design element(s) 141. For example, the design service(s) 126 adds a design element 123 to the design 103 in response to determining that the design template 105 includes a design element 143. The design service(s) 126 copies one or more attributes of the design element 143 to the design element 123.

In a particular example, the one or more attributes of the design element 123 (e.g., copied from the design element 143) include a type 171, a content role 179, text information 173, a media identifier 189, fill information 177, bounding block information 185, a position 175, a page tag 186, or a combination thereof. The type 171 indicates whether the design element 123 is or includes an image element, a text element, or a fill element. In a particular aspect, the type 171 indicates whether the design element 123 is or includes a foreground element or a background element.

The content role 179 of the design element 123 indicates a role of the design element 123 in the design 103. Some illustrative examples of content roles include style-related content roles (e.g., title, pre-title, subtitle, heading, or paragraph) and information structure-related content roles (e.g., name, address, invoice-tax-details, or invoice-items-purchased). In a particular aspect, a first set of content roles is associated with a first design template type. For example, the first set of content roles associated with Instagram® post template type includes a pre-title content role, a title content role, and a subtitle content role. A second set of content roles associated with another design template type may include more, fewer, or different content roles. A content role enables identification of corresponding design elements in designs and design templates.

When the design element 123 includes a text element, the text information 173 indicates text (if any) included in the design element 123. In some examples, the text information 173 indicates format information (e.g., second format information) of the design element 123. When the design element 123 includes an image element, the media identifier 189 indicates an image (if any) included in the design element 123. When the design element 123 includes a fill element, the fill information 177 indicates a fill color of the design element 123. The bounding block information 185 indicates a shape, a size, a height, a width, or a combination thereof, of a bounding block of the design element 123. The page tag 186 indicates a design page (e.g., a first page, a second page, etc.) of the design 103 that includes the design element 123. The position 175 indicates a location of the design element 123 on the design page of the design 103.

In a particular aspect, the design service(s) 126 initializes a type 157 (e.g., invitation design) of the design 103 based on the type 167 (e.g., invitation template) of the design template 105. In a particular aspect, the design service(s) 126 initializes format information 155 of the design 103 by copying the format information 165 of the design template 105.

Figure 4:
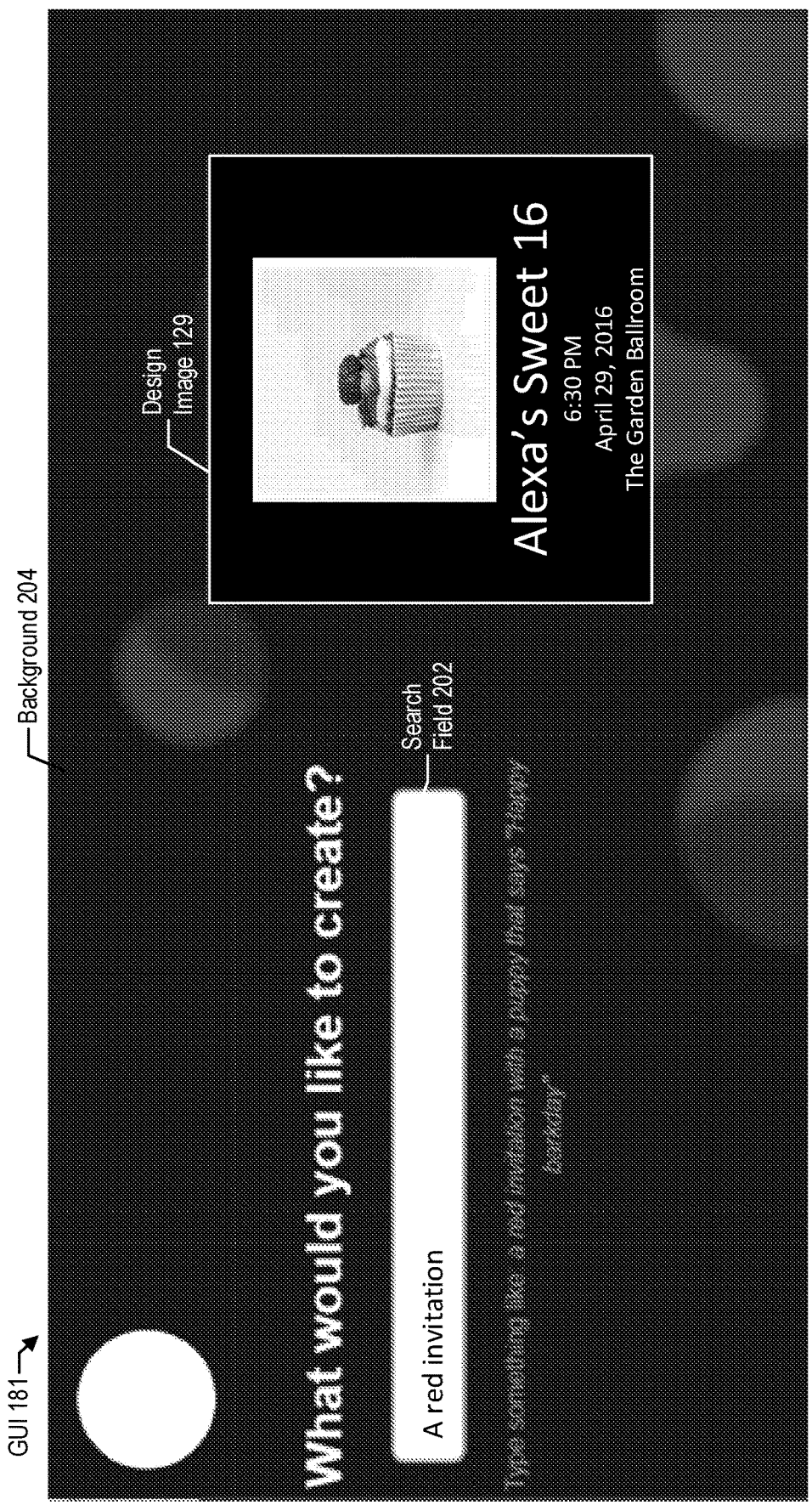
FIG. 4 illustrates particular examples of a search query and a corresponding design that may be generated by the system of FIG. 1.
Figure 5:
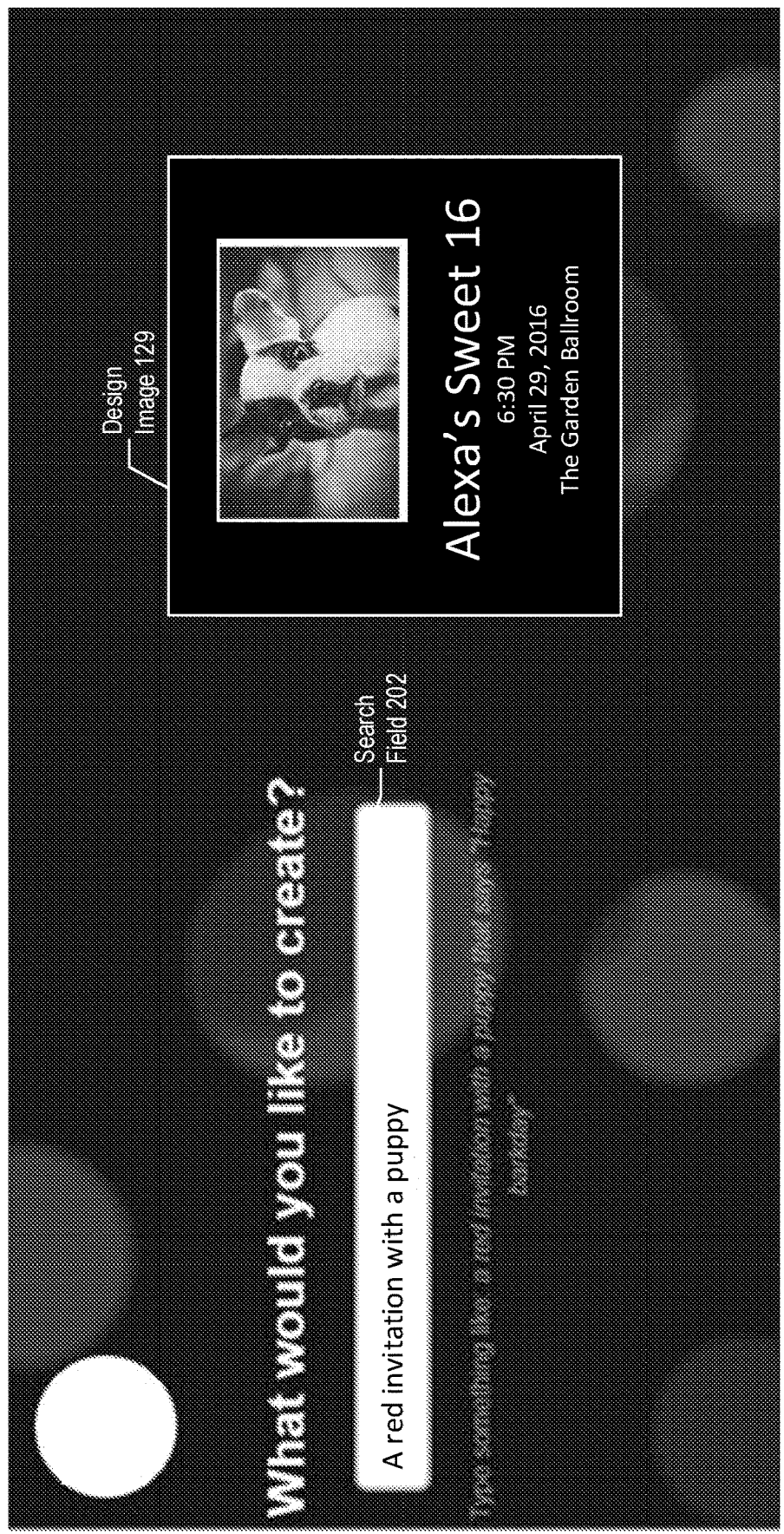
FIG. 5 illustrates particular examples of a search query and a corresponding design that may be generated by the system of FIG. 1.
Figure 6:
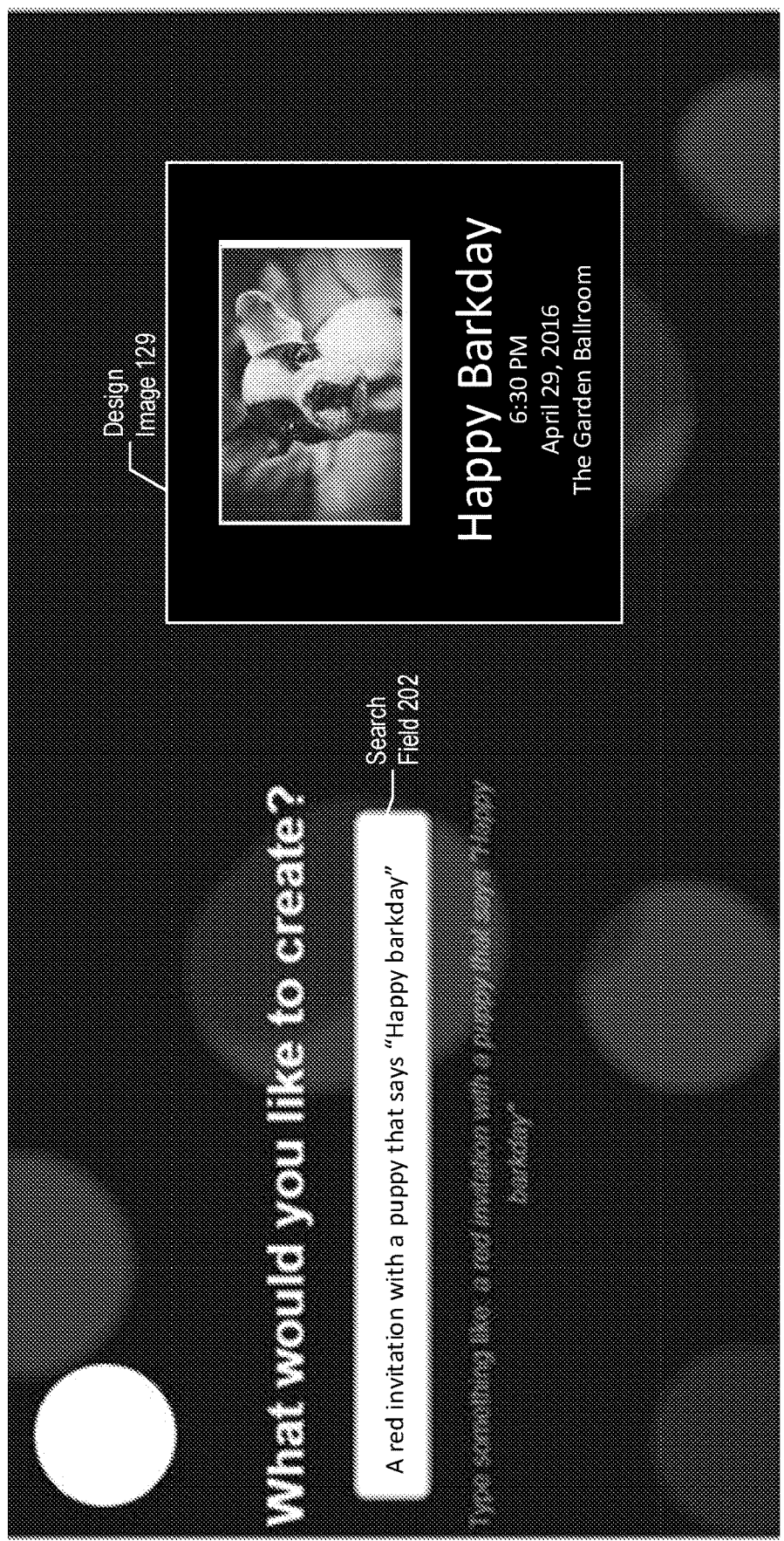
FIG. 6 illustrates a particular example of a search query and a corresponding design that may be generated by the system of FIG. 1.

The design service(s) 126 selects design content 119 based on the keywords 127 (e.g., "red", "invitation", "red invitation", or a combination thereof in the examples of FIGS. 4-6). The design content 119 includes a fill 135, an image 115, a font 125, or a combination thereof, that matches at least one of the keywords 127. For example, the design service(s) 126, in response to determining that at least one of the keywords 127 indicates a first color (e.g., "red"), sets the fill 135 to the first color.

In a particular example, the design service(s) 126 performs natural language analysis techniques to determine that a second keyword (e.g., "red") is a modifier of the first keyword (e.g., "invitation"). In some examples, the design service(s) 126, in response to determining that the second keyword (indicating a color) is a modifier of the first keyword (indicating a particular design template type), sets the fill 135 to the color indicated by the second keyword.

The design service(s) 126 updates the design 103 based on the design content 119. For example, the design service(s) 126 updates the design 103 to include a fill element (e.g., the design element 123) indicating the fill 135 of the first color. The fill element is added as a background element to the design 103. In a particular aspect, the design service(s) 126 updates the fill information 177 of a background fill element of the design 103 to include the fill 135 (e.g., a red fill). In an alternative aspect, the design service(s) 126 replaces another background element of the design 103 with the fill element (e.g., the design element 123). In a particular aspect, the design service(s) 126 adds the fill element (e.g., the design element 123) as a background element to the design 103.

The design service(s) 126 update the GUI 181 to include a design image 129 (e.g., a thumbnail image) of the design 103. In a particular aspect, the design service(s) 126 update the background 204 based on a color of the background element of the design 103. For example, the background 204 is updated to have a second color that is distinct from a first color of the background element. Updating the background 204 to have a second color that is distinct from the first color enables the design image 129 to stand out to the user 104 relative to the background 204. The design service(s) 126 provides the updated version of the GUI 181 to the client device 192.

The user 104 may continue to enter input (e.g., type) in the search field 202. In the example illustrated in FIG. 5, the search field 202 indicates an updated version of the search query 117 (e.g., "A red invitation with a puppy"). The design service(s) 126 identifies the keywords 127 (e.g., "red", "invitation", "red invitation", "puppy") by parsing the search query 117.

In a particular aspect, the user 104 can update the user input 109 to incrementally update the design 103 by updating the design content 119 (e.g., without changing the design template). In a particular example, the design service(s) 126 selects the image 115 based on determining that a first tag (e.g., dog) associated with the image 115 matches a keyword (e.g., puppy) of the keywords 127. In a particular aspect, the design service(s) 126 generates scores based on a count of tags of the images 113 that match at least one of the keywords 127. In this aspect, the design service(s) 126 selects the image 115 from the images 113 based on a first score of the image 115 (e.g., greater than a threshold score, a highest score, or both). The design service(s) 126 adds or updates an image element (e.g., the design element 123) of the design 103 to include the image 115. For example, the media identifier 189 of the design element 123 indicates an identifier of the image 115.

The design service(s) 126 updates the GUI 181 to include an updated version of the design image 129. The updated version of the design image 129 includes an image of the updated version of the design 103. The design service(s) 126 provides the updated version of the GUI 181 to the client device 192.

The user 104 may continue to enter input (e.g., type) in the search field 202. In the example illustrated in FIG. 6, the search field 202 indicates an updated version of the search query 117 (e.g., "A red invitation with a puppy that says "Happy barkday""). The design service(s) 126 identifies the keywords 127 (e.g., now including the quote "Happy barkday") by parsing the search query 117. In a particular aspect, the design service(s) 126 parses quoted text in the search query 117 as a text keyword. The design service(s) 126 updates the design 103 to include a text element (e.g., the design element 123) that includes the text keyword. For example, the design service(s) 126 updates a text element of the design 103 to include the text keyword, replaces a first text element of the design 103 with a second text element that includes the text keyword, or adds a text element that includes the text keyword to the design 103. In a particular aspect, the text element that indicates the text keyword has a particular content role (e.g., a title content role).

In a particular aspect, the search query 117 can include text style information (e.g., "A red invitation with a puppy that says "Happy barkday" in Times New Roman"). Keywords (e.g., "Times New Roman") may indicate a font 125 (e.g., Times New Roman font). The design service(s) 126 selects the font 125 (as part of the design content 119) in response to determining that one or more of the keywords 127 indicate the font 125. The design service(s) 126 updates the design 103 based on the font 125. In a particular example, the design service(s) 126 updates the format information 155 to indicate the font 125 for each design element type. In another example, the design service(s) 126 updates the format information 155 to indicate the font 125 for a particular design element type (e.g., a title design element type). In a particular implementation, the design service(s) 126 determines that a text parsing technique (e.g., a parse tree) indicates that second keywords (e.g., "Times New Roman") indicating the font 125 are modifiers of one or more first keywords (e.g., "Happy barkday") indicating the text keyword. The design service(s) 126, in response to determining that the second keywords (e.g., "Times New Roman") indicating the font 125 are modifiers of the first keywords (e.g., "Happy barkday") indicating the text keyword, updates the text information 173 of the text element (e.g., the design element 123) to indicate the font 125.

The design service(s) 126 updates the GUI 181 to include an updated version of the design image 129. The updated version of the design image 129 includes an image of the updated version of the design 103. The design service(s) 126 provides the updated version of the GUI 181 to the client device 192.

Figure 7:
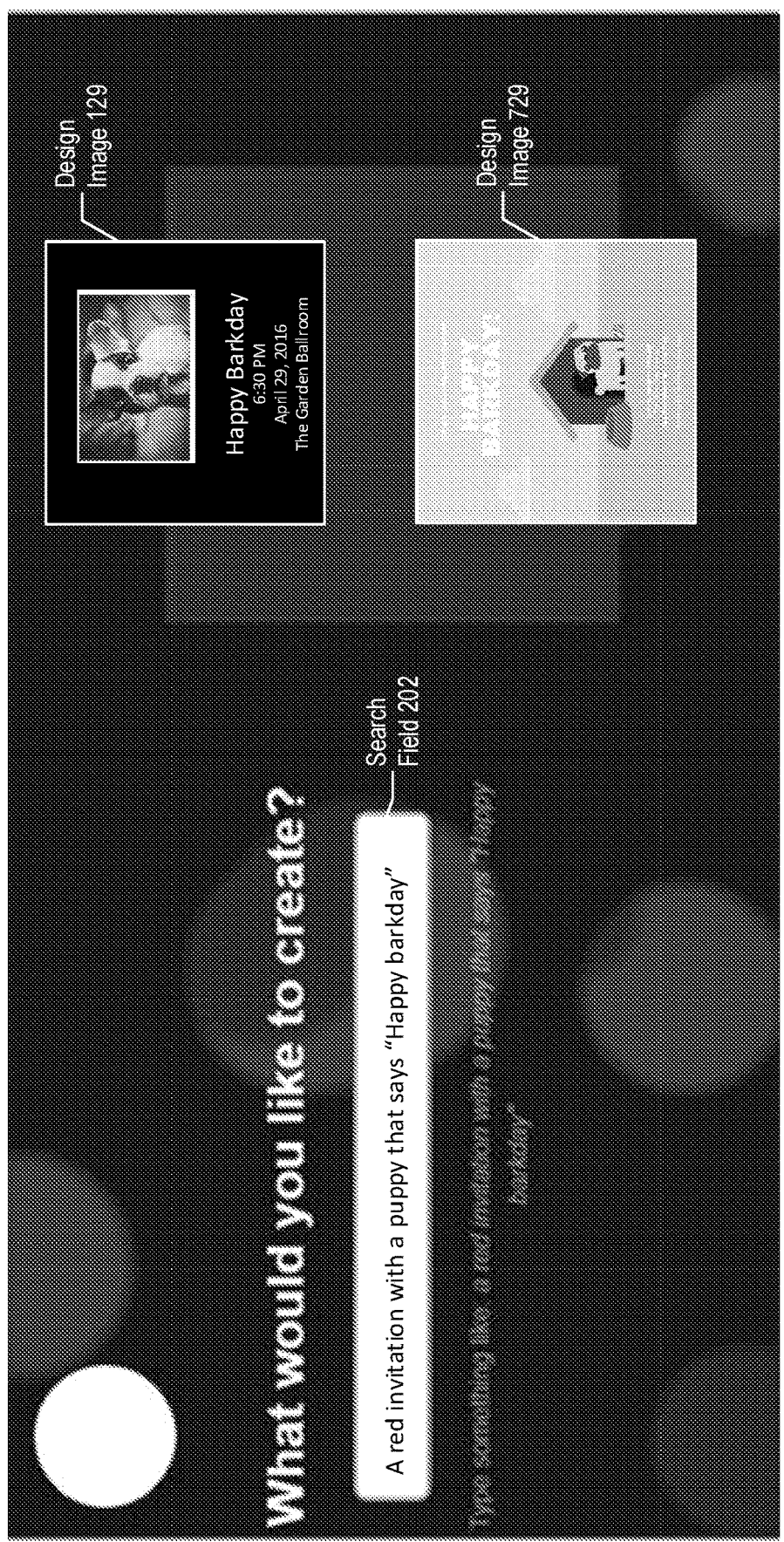
FIG. 7 illustrates a particular example of a search query and corresponding designs that may be generated by the system of FIG. 1.
Figure 9:
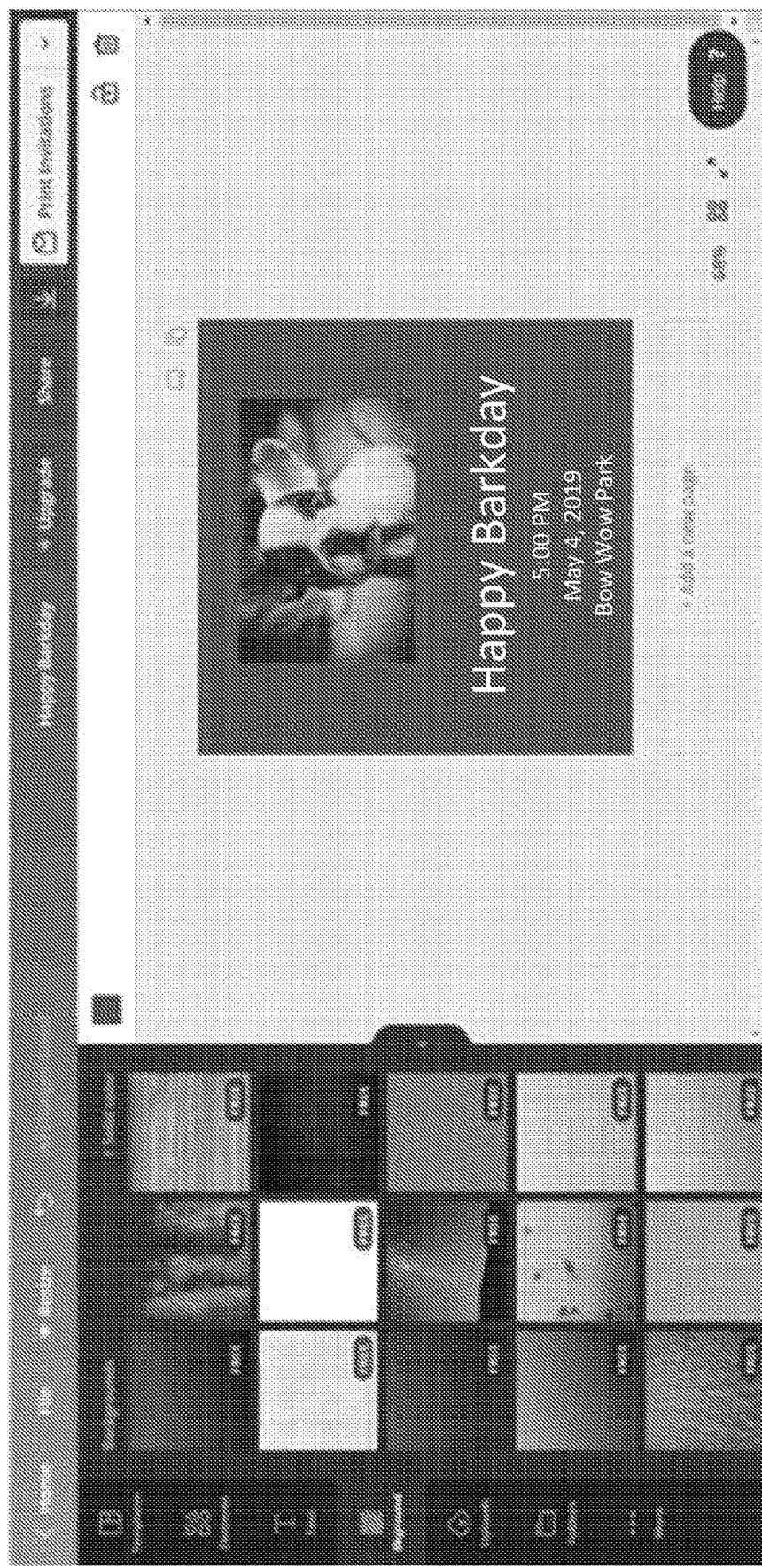
FIG. 9 illustrates a particular example of a user interface to edit a design that may be generated by the system of FIG. 1.

In a particular implementation, the design service(s) 126 generates multiple designs based on the keywords 127. For example, the design service(s) 126 selects a second design template based on the keywords 127. In some examples, the second design template is distinct from the design template 105. In a particular aspect, the second design template corresponds to a next highest score among the scores for the design templates 111. The design service(s) 126 generates a second design based on the second design template. The design service(s) 126 select second design content based on the keywords 127. In some examples, the second design content is distinct from the design content 119. The design service(s) 126 updates the second design based on the second design content. The design service(s) 126 generates a design image of the second design. In the example illustrated in FIG. 7, the GUI 181 includes the design image 129 and a design image 729 of the second design. Including multiple design images on the GUI 181 enables comparison of the design 103 and the second design. In a particular aspect, the user 104 selects the design image 129 or the design image 729 to edit the corresponding design, as further described with reference to FIG. 9.

Figure 8:
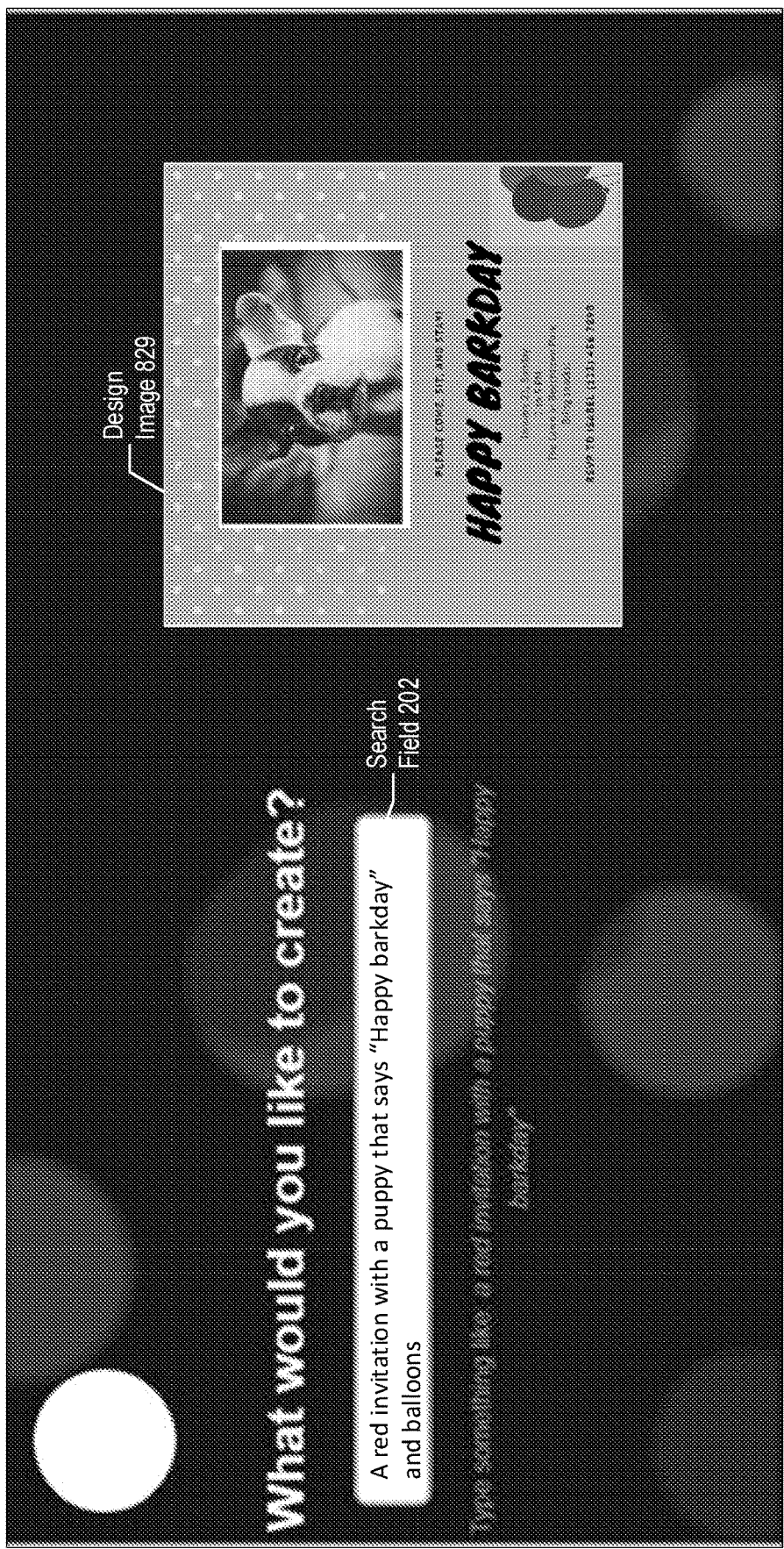
FIG. 8 illustrates a particular example of a search query and a corresponding design that may be generated by the system of FIG. 1.

The user 104 may continue to enter input (e.g., type) in the search field 202. In the example illustrated in FIG. 8, the search field 202 indicates an updated version of the search query 117 (e.g., "A red invitation with a puppy that says "Happy barkday" and balloons"). The design service(s) 126 identifies the keywords 127 (e.g., now including the keyword "balloons") by parsing the search query 117. In a particular aspect, the design service(s) 126 updates a design template based on updated keywords. For example, the design service(s) 126 selects a second design template based on the keywords 127 (e.g., "red", "invitation", "red invitation", "puppy", "balloons"). In a particular aspect, the GUI 181 includes a reset option (not illustrated). In this aspect, the design service(s) 126 selects the second design template based on the keywords 127 (updated keywords) in response to receiving a selection of the reset option. Alternatively, the design service(s) 126, subsequent to generating the design 103, refrains from updating the design template if the reset option is not selected. In this aspect, the user 104 can update the user input 109 to incrementally update the design 103 by updating the design content 119 (without changing the design template), as described herein. In a particular aspect, the GUI 181 does not include the reset option and the design service(s) 126 selects the second design template based on the keywords 127 independently of receiving a selection of any reset option.

In a particular aspect, the design service(s) 126 (e.g., in response to receiving a selection of the reset option) selects a second design template based on the keywords 127 (e.g., "red", "invitation", "red invitation", "puppy", "balloons").

The design service(s) 126 generates a second design based on the second design template. For example, the design service(s) 126 adds a second design element to the second design in response to determining that the second design template includes a first design element. The design service(s) 126 copies one or more attributes of the first design element to the second design element.

In a particular aspect, generating the second design includes applying the design 103 to the second design template. For example, the design service(s) 126 generates a content signature of the design 103. The content signature indicates attributes of the design element(s) 121 of the design 103. The design service(s) 126 applies the content signature to the second design, as described herein. The design service(s) 126 generates element match data indicating elements of the design 103 that match elements of the second design. For example, the design service(s) 126 generates a first list indicating the design element(s) 121 of the design 103 and a second list indicating design elements of the second design (copied from the second design template). The design service(s) 126, in response to determining that the design element 123 of the first list has the same content role and the same page tag as a second design element of the second list, updates element match data to indicate that the design element 123 matches the second design element of the second list. For example, a title element on page 1 of the design 103 matches a title element on page 1 of the second design template. Design elements that are added to the element match data are removed from the first list and the second list. For example, the design service(s) 126 removes the design element 123 from the first list, and removes the second design element from the second list.

The design service(s) 126 transfers content from the design element(s) 121 to matching design elements of the second design. In a particular aspect, the design service(s) 126, in response to determining that the element match data indicates that the design element 123 of the design 103 matches the second design element of the second design, copies the text information 173, the media identifier 189, the fill information 177, or a combination thereof, of the design element 123 to the second design element. The second design element of the second design is formatted based on first format information of the second design template, second format information indicated by the text information 173, or both.

In a particular aspect, the design service(s) 126 selects second design content (e.g., an image of balloons) based on the keywords 127, updates the second design based on the second design content, and updates the GUI 181 based on a design image 829 of the second design, as described with reference to FIG. 4.

Although examples described herein include the keywords 127 and text elements in the English language, it should be understood that in some examples the design service(s) 126 support internationalization. In a particular example, the design service(s) 126 selects the design template 105 based at least in part on determining that the design template 105 has a language tag that matches a language (e.g., Arabic) that is indicated by the search query 117 (e.g., A card that says "Happy Birthday" in Arabic). In another example, the design service(s) 126 selects the design template 105 (e.g., a birthday card template) independently of a language tag and generates the design 103 based on the design template 105. In this example, the design service(s) 126 performs language translation on text elements of the design 103 from a first language (e.g., English) associated with the design template 105 to a second language (e.g., Arabic) indicated by the search query 117.

A design image (e.g., the design image 129, the design image 729, or the design image 829) is selectable to edit a corresponding design. For example, the design service(s) 126, in response to receiving a selection of the design image 129, updates the GUI 181 (e.g., generates a second GUI) to include one or more options to edit the corresponding design (e.g., the design 103), a save option to store the corresponding design, or a combination thereof. The GUI 181 may include a display portion that displays the design 103. In various aspects, the GUI 181 may enable at least any graphic design function that is generally found in a standalone graphic design application, although it is to be appreciated that the GUI 181 may enable other functionality as well. The design service(s) 126 provides the updated version of the GUI 181 to the client device 192. In the example illustrated in FIG. 9, the user 104 updates a text element of the design 103 to replace default text (e.g., "The Garden Ballroom") applied from the design template 105 with customized text (e.g., "Bow Wow Park").

In a particular aspect, the user 104 selects the options to edit the design 103. The client device 192, in response to receiving the user input 109 indicating the edits to the design 103, sends the user input 109 to the computing environment. The design service(s) 126 updates the design 103 based on the user input 109. In a particular aspect, the design service(s) 126, in response to receiving a selection of the save option, stores the updated version of the design 103 in the design database(s) 184. In a particular aspect, the design service(s) 126 updates, at a first time, the search selection data 107 to indicate that the design 103 is saved at the first time by the user 104 and that the design 103 is based on the design template 105 and the search query 117. The system 100 thus enables automatic generation of the design 103 based on the search query 117 and updates to the search query 117. The design 103 includes a pre-applied applied layout based on the design template 105 (selected based on the keywords 127). The design 103 is updated based on design content 119 that is selected based on the keywords 127. The design 103 is thus customized based on the search query 117, and the system 100 thus provides a rich and robust way to dynamically create and edit graphical/visual designs based on natural language text entry.

Whereas FIG. 1 illustrates an example of a system 100 that is operable to generate a design based on a user search query (examples of which are illustrated and described with reference to FIGS. 2-7), it is to be understood that operation of such a system may include various local and/or cloud-based components that are not illustrated in FIG. 1. For example, FIG. 10 depicts, in greater detail, a logical diagram of a system 1000 operable to support aspects of the present disclosure. Although illustrated in a logical diagram, it is to be understood that the various components of the system 1000 may include or may correspond to computer hardware, computer software, or a combination thereof. Moreover, components of the system 1000 may be configured to communicate with each other, for example via wired network(s) and/or wireless network(s). Thus, in various implementations, operations described herein as being performed by a particular component of FIG. 10 may be performed by dedicated hardware, software, or a combination thereof corresponding to the particular component.

In particular aspects, the system 1000 supports browser-based and mobile application- based access to a graphic design website. To illustrate, the graphic design website may correspond to the GUI 181 of FIG. 1, and some or all of the components in the system 1000 may be implemented by the computing environment, one or more servers, the design database(s) 184 of FIG. 1, a document database 1084, a media database 1085, the client device 192 of FIG. 1, one or more message queues 1042, load balancers 1006, and/or an export database 1088. For example, users may log in to the graphic design website and create, edit, and save graphic designs. The graphic design website may support operations including, but not limited to, creating a new design based on a search query (as described with reference to the preceding figures), applying a template to a design, searching for and adding images to a design, saving a design, publishing of a design, etc.

The system 1000 includes a web front end 1002 executed at a platform as a service (PaaS) provider 1004. The PaaS provider 1004 may enable at-scale deployment of software as a service (SaaS) applications, such as web applications. For example, the web front end 1002 may represent one, five, ten, or some other number of instances of a SaaS application that executes on hardware owned by and/or leased from the PaaS provider 1004. Each such instance of the front end SaaS application may be accessible via the Internet. In some examples, a browser or a mobile application executed by a user's computing device may access the web front end 1002 via the CDN 101. The CDN 101 may also be configured to cache static content (e.g., thumbnails, static images, static web content, etc.). To illustrate, when a user requests a particular content item, such as a particular image, if the CDN 101 (e.g., a server thereof) stores a copy of the image, the CDN may respond to the request without passing the request further into the service infrastructure shown in FIG. 10. The CDN 101 may thus include multiple geographically distributed "edge" servers that cache content.

The web front end 1002 may be configured to serve a graphic design website to requestors, such as by responding to hypertext transfer protocol (HTTP) GET requests, HTTP POST requests, etc. The web front end 1002 may also be configured to respond to application programming interface (API) calls originating from web browsers and/or mobile apps. In some examples, the web front end 1002 may utilize an in-memory cache 1003 that stores session data. To illustrate, when a user logs in to the graphic design website served by the web front end 1002, information regarding the user (e.g., display name, photo, subscription level, e-mail address, etc.) may be stored in the in-memory cache 1003 for rapid retrieval, processing, and/or rendering on some or all of the webpages of the graphic design website. Use of the in-memory cache 1003 may thus enable quickly serving webpages without accessing backend systems to determine user information.

The system 1000 includes the load balancers 1006 configured to support communication and workload distribution from the web front end 1002 to a plurality of backend services or microservices that execute, for example, on one or more virtual machines in a cloud computing environment. Each such virtual machine may be implemented using physical hardware that is owned by and/or leased by a cloud service provider. The system 1000 may support scaled, dynamic deployment of services based on scale groupings in a multi-tiered configuration. In particular aspects, services may be grouped in certain virtual machines based on expected load patterns for the services. The architecture of the system 1000 may enable the reorganization of these groupings with low effort, based on changes in observed load patterns or the introduction of new services. Separating services across multiple virtual machines may also enable scaling specific service groups in response to increases in certain kinds of loads. This scaling may occur automatically based on monitoring of load, and may also be triggered manually in anticipation of load increases. To illustrate, if an increasing number of export tasks (e.g., publish tasks) are observed (e.g., based on percentage of busy vs. idle time), more virtual machines that include instances of the export service 1010 and/or an export worker 1048 may dynamically be instantiated to service the demand.

Conversely, if an administrator of the system 1000 anticipates export volume (e.g., publish volume) to increase, the administrator may manually initialize additional virtual machines that include instances of the export service 1010 and/or the export worker 1048. When export volume decreases, the virtual machines may be automatically (e.g., based on percentage of busy vs. idle time) or manually scaled down.

Figure 10:
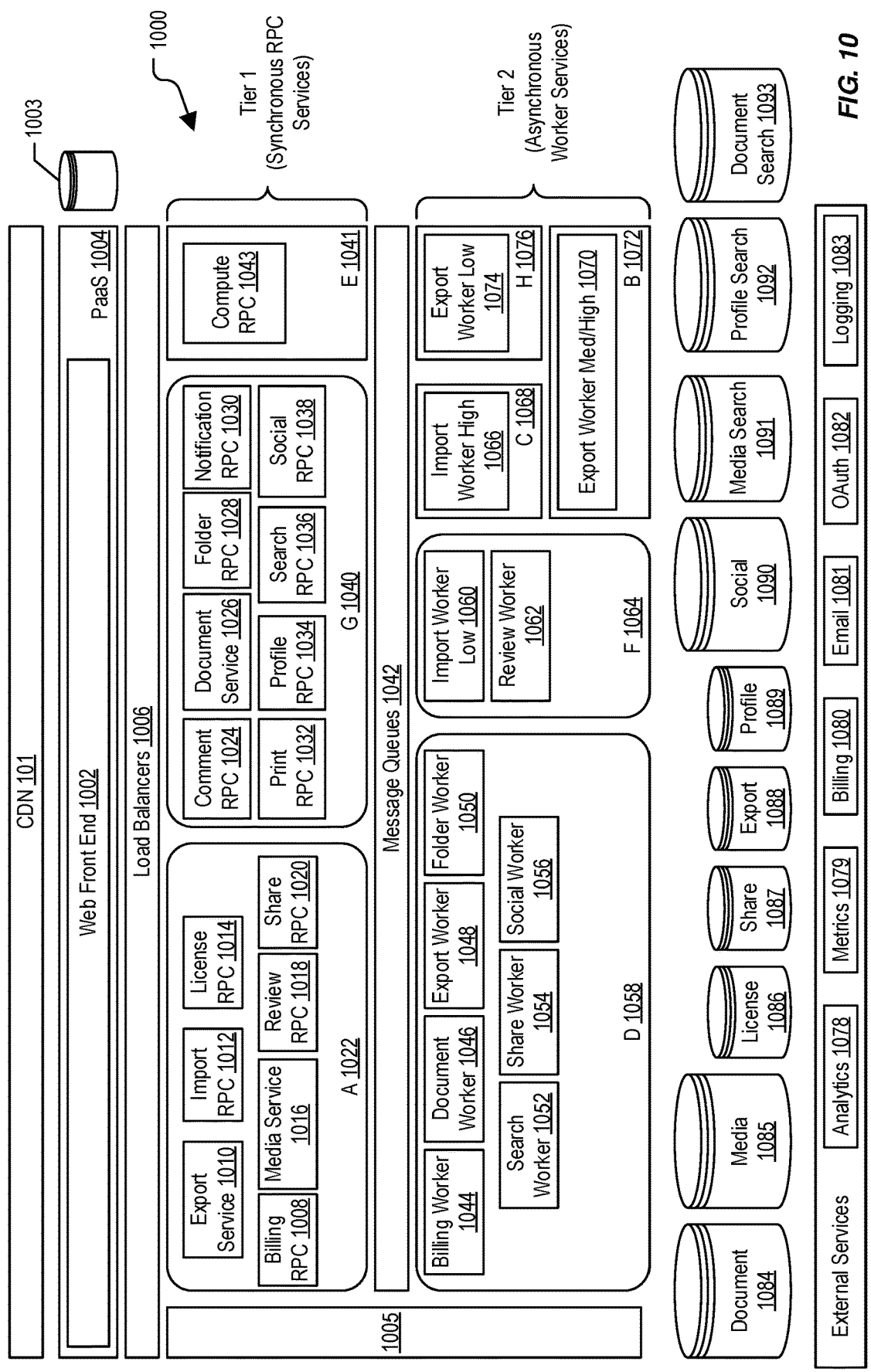
FIG. 10 illustrates another particular example of a system that is operable to generate a design based on a user search query.

In the example of FIG. 10, a first tier of services includes synchronous "request-response" remote procedure call (RPC) services and a second tier includes asynchronous "worker" services. A synchronous RPC service may receive first data from a requestor, perform one or more processing functions, and return second data to the requestor. Such synchronous request-response services may be used for tasks that can be completed relatively quickly, e.g., in three seconds or less, because in some examples a requestor (e.g., a web browser or mobile app) may block while waiting for a response. Conversely, the asynchronous worker services of the second tier may be used for background tasks and other tasks that cannot or may not be completed relatively quickly.

In FIG. 10, the first tier includes a first scale group 1022 (designated "A"), a second scale group 1040 (designated "G"), and a third scale group 1041 (designated "E"). The first scale group 1022 includes a billing RPC service 1008, an export service 1010, an import RPC service 1012, a license RPC service 1014, a media service 1016, a review RPC service 1018, and a share RPC service 1020. To illustrate, a virtual machine corresponding to the first scale group 1022 may execute the illustrated RPC services.

The billing RPC service 1008 may be configured to perform synchronous billing tasks (e.g., checking account balance). The export service 1010 may be used to perform synchronous graphic design export tasks (e.g., publishing a design). The import RPC service 1012 may be configured to enable user importing of media assets for use in graphic design creation/editing. The license RPC service 1014 may be configured to enforce image licenses (e.g., one-time-use licenses). The media service 1016 may be configured to track and catalog media assets available via the system 1000, including but not limited to user-uploaded and/or library images, templates, fonts, etc. The review RPC service 1018 may be configured to facilitate acceptance of contributor media (e.g., uploading of media assets by authorized contributors of the graphic design website). The share RPC service 1020 may enable sharing of graphic designs with other users, such as via social media accounts.

The second scale group 1040 includes a comment RPC service 1024, a document service 1026, a folder RPC service 1028, a notification RPC service 1030, a print RPC service 1032, a profile RPC service 1034, a search RPC service 1036, and a social RPC service 1038. The comment RPC service 1024 may enable users to comment on graphic designs in comment threads. The document service 1026 may enable core design creation, design updating, and design deletion functionality of the graphic design website. The folder RPC service 1028 may enable navigating into and out of different folders associated with a user's account. The notification RPC service 1030 may enable generating and serving notifications to users via the graphic design website (e.g., when a user's design is "liked" or commented on). In some aspects, multiple such notifications may be coalesced into an e-mail that is sent to an e-mail address of the user or that is shown on a pop-up when the user accesses the graphic design website. The print RPC service 1032 may be a format service that enables sending a graphic design to a third- party printer, for example to be printed and then delivered to a physical mailing address of the user. The profile RPC service 1034 may enable users to manage their graphic design website account. The search RPC service 1036 may enable searching for images, templates, designs, etc. The social RPC service 1038 may enable users to perform social networking engagement on the graphic design website (e.g., "follow" another user, "like" another user's design, etc.) and may generate "feeds" of designs created by followed users. The third scale group 1041 includes a compute RPC service 1043 that may be dedicated for performing certain fast high-CPU-utilization operations, such as hashing and solving of passwords.

The second tier of services in FIG. 10 includes a fourth scale group 1058 (designated "D"), a fifth scale group 1064 (designated "F"), a sixth scale group 1068 (designated "C"), a seventh scale group 1076 (designated "H"), and an eighth scale group 1072(designated "B"). The fourth scale group 1058 includes a billing worker 1044, a document worker 1046, an export worker 1048, a folder worker 1050, a search worker 1052, a share worker 1054, and a social worker 1056. The fifth scale group 1064 includes a low priority import worker 1060 and a review worker 1062. The sixth scale group 1068 includes a high priority import worker 1066. The seventh scale group 1076 includes a low priority export worker 1074. The eighth scale group 1072 includes a medium/high priority export worker 1070. In illustrative aspects, the asynchronous worker services in FIG. 10 may perform longer and/or more complex versions of the operations performed by the corresponding RPC services of FIG. 10. In a particular implementation, the priority designations shown in FIG. 10 (e.g., "low," "medium," and "high") correspond to an amount of dedicated processing resources. "High" priority may be used for jobs that are triggered by user actions whereas "medium" or "low" priority may be used for jobs that are not triggered by user actions (e.g., background jobs).

It is to be understood that the various services and groupings thereof shown in FIG. 10 is for illustration only and is not to be considered limiting. In alternative aspects, more, fewer, and/or different services may be present in the system. Moreover, a different grouping of services into different scale groups than shown in FIG. 10 may be used. In some aspects, each of the scale groups shown in FIG. 10 corresponds to a virtual hardware instance, i.e., a virtual machine running at a cloud services provider. Thus, at any given time, there may be one or more active/executing instances of each of the scale groups, and the specific numbers of active/executing virtual machine instances may dynamically change based on the overall workload being managed by the load balancers 1006. Coordination and configuration of the various instances, including communication between instances and/or services executed therein, may be managed by a coordination tool 1005, which may itself be a cloud-based system.

During operation, the synchronous RPC services of the first tier may be configured to communicate with the asynchronous workers' services of the second tier via the message queues 1042 and may utilize the asynchronous workers to perform time- consuming tasks. For example, the export service 1010 may receive a request that a user wants to export a graphical design. The export service 1010 may push a corresponding work request into the message queues 1042. An export worker (e.g., the medium/high priority export worker 1070) may respond to the work request by rendering the graphical design to a web output. The web output may then be passed back to the requesting user. As another example, the folder RPC service 1028 may receive a request indicating that a user wants to share a folder of graphic designs with another user. The folder RPC service 1028 may use the message queues 1042 to request that the folder worker 1050 set the corresponding permissions on the folder and on each of the items in that folder. As yet another example, asynchronous workers may be used to perform routine background tasks in the system 1000, such as daily verification of subscription levels.

During certain operations at the system 1000, the illustrated services may access one or more databases or data stores. For example, the document database 1084 may store files corresponding to user-created graphic designs and the media database 1085 may store image uploads, fonts, and templates that are accessible via the graphic design website. In an illustrative aspect, the document database 1084 may be accessed by the document worker 1046 when a user opens or saves a graphic design. In another illustrative aspect, the media database 1085 may be accessed by the media service 1016 when a user uploads or retrieves an image, a template, or a font.

The system 1000 may also include one or more of a license database 1086, a share database 1087, the export database 1088, a profile database 1089, or a social database 1090. The license database 1086 may be used by the license RPC service 1014 to track licenses (e.g., one-time-use licenses for images) that have been acquired by a user. The share database 1087 may be used by the share RPC service 1020 or the share worker 1054 to manage sharing of graphic designs with other users (e.g., via social network(s)). The export database 1088 may be used by the export service 1010, the export worker 1048, the low priority export worker 1074, or the medium/high priority export worker 1070 to track user exports of their graphic designs into different output formats. The profile database 1089 may support searching for user profiles based on different criteria. The social database 1090 may support social media aspects of the graphic design website.

The system 1000 may also include databases or data stores that support search functionality.

For example, a media search database 1091 may be accessed by the search RPC service 1036 or the search worker 1052 when a user searches for images, templates, or fonts. As another example, a profile search database 1092 may be accessed by the profile RPC service 1034 when a user edits the profile information associated with their account. As yet another example, a document search database 1093 may be accessed by the document worker 1046 when a user searches for a previously saved graphic design.

Certain operations at the system 1000 may involve accessing "external" services that are not part of the core service oriented platform of the graphic design website. Examples of such external services may include, but are not limited to, an analytics service 1078, a metrics service 1079, a billing service 1080, an e-mail service 1081, an open authorization (OAuth) service 1082, or a logging service 1083. The analytics service 1078 may receive analytics events (e.g., messages) each time a user performs an action on the graphic design website, and may enable per-user and macro level analytics of graphic design website workflow, operations, and performance The metrics service 1079 may collect and provide performance information regarding the various components of the system 1000. The billing service 1080 may interface to one or more external payment providers, such as for credit card processing, mobile payment processing, etc. The e-mail service 1081 may enable generating and/or sending e-mails to users (e.g., for notifications, password reset, etc.). The OAuth service 1082 may enable federated logins to the graphic design website using social network credentials and may also support authentication with certain publish endpoints. The logging service 1083 may index events/messages that are generated by the components of the system 1000 for later diagnostic searching.

One example of an operation that may be supported by the system 1000 is logging in to the graphic design website via an Internet browser or a mobile app. A login request may be received by the web front end 1002 from the Internet browser or mobile app. The login request may be routed by the load balancers 1006 to an instance of the profile RPC service 1034, which may "look up" the user in the profile database 1089 and may authenticate the user (federated social networking login may involve the OAuth service 1082). Once the user is authenticated, the graphic design website may load a custom homepage for the user, which may include operations being performed by an instance of the folder RPC service 1028, the document worker 1046, etc. The custom homepage may then be returned to the user's Internet browser or mobile app.

Another example of an operation that may be supported by the system 1000 is starting a new design or opening an existing design. When a user clicks on a new design template, the web front end 1002 may provide the user's Internet browser or mobile application a graphical design interface (e.g., HTML code) that is executable to edit the new or existing design. In the case of loading an existing design, the document service 1026 and/or the document worker 1046 may access the design database(s) 184 to retrieve the existing design, and the media service 1016 may load media assets that are included in the design from the media database 1085.

Another example of an operation that may be supported by the system 1000 is when a user updates a design using the graphical design interface served by the graphic design website. As the user updates the design, the updates may be processed by the document service 1026 and/or the document worker 1046. For example, the service(s) may process image or text movement, insertion, deletion, resizing, recoloring, etc.

Another example of an operation that may be supported by the system 1000 is when a user imports an image. In this case, the import RPC service 1012 and/or one of the import workers 1060, 1066 may receive a user-uploaded image, process the image, and integrate the image into the media database 1085 for subsequent retrieval by the media service 1016.

Another example of an operation that may be supported by the system 1000 is when a user applies a template to a design. In this case, the media search database 1091 may provide via the media service 1016, media assets corresponding to the template. The insertion of the media assets into the design may then be processed by the document service 1026 and/or the document worker 1046 as an update to the user's design.

Another example of an operation that may be supported by the system 1000 is when a user searches for a media asset and then drags-and-drops the media asset into a design. For example, when a user enters a search query "dog," the search RPC service 1036 and/or the search worker 1052 may access the media search database 1091 to retrieve search results for "dog." The search results may be presented by the user's Internet browser or mobile app. When the user adds a particular search result, e.g., a particular image of a dog, to their design, the document service 1026 or the document worker 1046 may process the corresponding update to the design.

Figure 11:
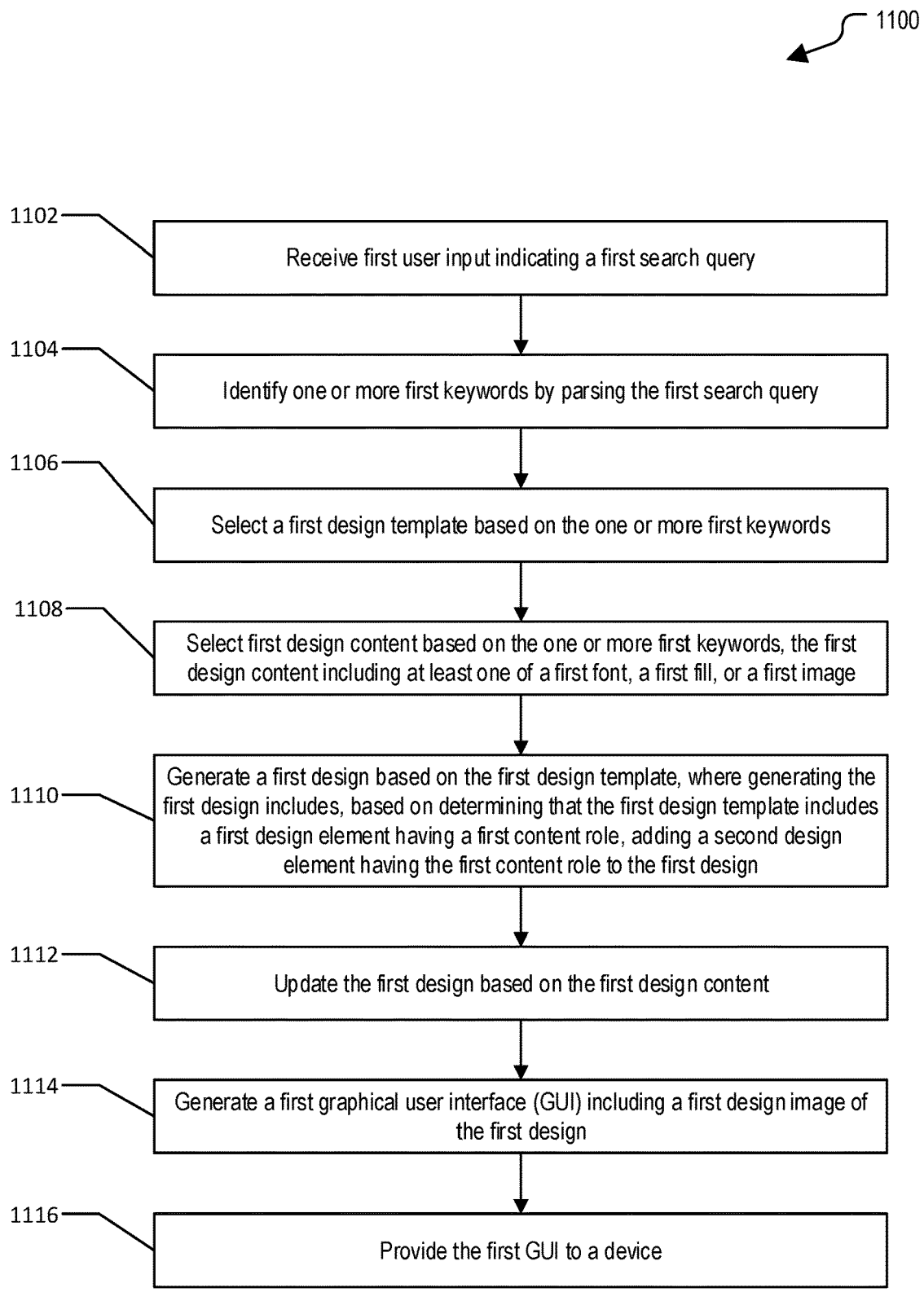
FIG. 11 illustrates a particular example of a method of generating a design based on a user search query.

In a particular aspect, the system 1000 may support generating a design based on a search query. For example, a user may generate a design by providing a search query, as described with reference to the preceding FIGS. In some aspects, component(s) of the system 1000 (and/or the system 100) may perform a method 1100 of FIG. 11 to generate and/or update the design based on the search query and/or modifications to the search query.

The method 1100 includes receiving first user input indicating a first search query, at 1102. For example, the design service(s) 126 of FIG. 1 receives the user input 109 via a network interface from the CDN 101. The user input 109 indicates the search query 117, as described with reference to FIGS. 1-6.

The method 1100 also includes identifying one or more first keywords by parsing the first search query, at 1104. For example, the design service(s) 126 of FIG. 1 identifies the keywords 127 (e.g., "red", "invitation", and "puppy") by parsing the search query 117 (e.g., "A red invitation with a puppy"), as described with reference to FIGS. 1-6.

The method 1100 further includes selecting a first design template based on the one or more first keywords, at 1106. For example, the design service(s) 126 of FIG. 1 selects the design template 105 (e.g., a birthday template with a red color tag) based on the keywords 127, as described with reference to FIGS. 1 and 4.

The method 1100 also includes selecting first design content based on the one or more first keywords, at 1108. For example, the design service(s) 126 of FIG. 1 selects the design content 119 (e.g., an image of a dog) based on the keywords 127 (e.g., "puppy"), as described with reference to FIGS. 4-6. The design content 119 includes at least one of the font 125, the fill 135, or the image 115.

The method 1100 further includes generating a first design based on the first design template, at 1110. For example, the design service(s) 126 generates the design 103 based on the design template 105, as described with reference to FIGS. 1 and 4. To illustrate, generating the design 103 includes, based on determining that the design template 105 includes the design element 143 having the content role 179, adding the design element 123 (e.g., an image element with a cupcake image) having the content role 179 to the design 103.

The method 1100 also includes updating the first design based on the first design content, at 1112. For example, the design service(s) 126 of FIG. 1 updates the design 103 based on the design content 119 (e.g., the cupcake image in the image element is replaced with the image of the dog), as further described with reference to FIGS. 1 and 4-6.

The method 1100 further includes generating a first graphical user interface (GUI) including a first design image of the first design, at 1114. For example, the design service(s) 126 of FIG. 1 generates the GUI 181 including the design image 129 of the design 103, as described with reference to FIGS. 1 and 4-6.

The method 1100 also includes providing the first GUI to a device, at 1116. For example, the design service(s) 126 of FIG. 1 provide the GUI 181, via a network interface, to the client device 192.

The method 1100 thus enables automatically generating a design (e.g., the design 103) based on a search query (e.g., the search query 117) and updates to the search query. The keywords 127 are identified by parsing the search query 117. The design template 105 is selected based on one or more of the keywords 127. Design content 119 is selected based on one or more of the keywords 127. The design 103 is generated based on the design template 105. The design 103 is updated based on the design content 119. The design 103 is thus customized based on the keywords 127, and the method 1100 thus provides a rich and robust way to dynamically create and edit graphical/visual designs based on natural language text entry.

Methods and devices that may implement aspect(s) of the various features of the present disclosure have been described with reference to the drawings. The drawings and the associated descriptions are provided to illustrate aspects and not to limit the scope of the present disclosure. Reference to any specific aspect, aspect, or implementation is intended to indicate that a particular feature, structure, or characteristic described in connection therewith is included in at least an aspect, aspect, or implementation of the present disclosure. However, the various uses of the terms "aspect," "aspect," or "implementation" are not necessarily all referring to the same single aspect, aspect, or implementation.

In a particular aspect, an apparatus includes network interface and a processor. The network interface is configured to receive first user input from a client device. The first user input indicates a first search query. The processor is configured to identify one or more first keywords by parsing the first search query. The processor is also configured to select a first design template based on the one or more first keywords. The processor is further configured to select first design content based on the one or more first keywords. The first design content includes at least one of a first font, a first fill, or a first image. The processor is also configured to generate a first design based on the first design template. Generating the first design includes, based on determining that the first design template includes a first design element having a first content role, adding a second design element having the first content role to the first design. The processor is further configured to update the first design based on the first design content. The processor is also configured to generate a first graphical user interface (GUI) including a first design image of the first design. The processor is further configured to provide the first GUI via the network interface to the client device.

In another particular aspect, a method includes receiving, at a first device from a second device, first user input indicating a first search query. The method also includes identifying, at the first device, one or more first keywords by parsing the first search query. The method further includes selecting, at the first device, a first design template based on the one or more first keywords. The method also includes selecting, at the first device, first design content based on the one or more first keywords. The first design content includes at least one of a first font, a first fill, or a first image. The method further includes generating, at the first device, a first design based on the first design template. Generating the first design includes, based on determining that the first design template includes a first design element having a first content role, adding a second design element having the first content role to the first design. The method also includes updating, at the first device, the first design based on the first design content. The method further includes generating, at the first device, a first graphical user interface (GUI) including a first design image of the first design. The method also includes providing the first GUI from the first device to the second device.

In another particular aspect, a computer-readable storage device stores instructions that, when executed by a processor, cause the processor to perform operations including receiving first user input indicating a first search query. The operations also include identifying one or more first keywords by parsing the first search query. The operations further include selecting a first design template based on the one or more first keywords. The operations also include selecting first design content based on the one or more first keywords. The first design content includes at least one of a first font, a first fill, or a first image. The operations further include generating a first design based on the first design template. Generating the first design includes, based on determining that the first design template includes a first design element having a first content role, adding a second design element having the first content role to the first design. The operations also include updating the first design based on the first design content. The operations further include generating a first graphical user interface (GUI) including a first image of the first design. The operations also include providing the first GUI to a client device.

In the foregoing description, specific details are given to provide a thorough understanding of the present disclosure. However, it will be understood by one of ordinary skill in the art that the present disclosure can be practiced without these specific details. Well-known structures and techniques may not be shown in detail, in order to avoid obscuring the illustrated aspects. For example, algorithms may be shown in block diagrams.

It is noted that aspects may be described as a process that is depicted as a flowchart, a flow diagram, a structure diagram, or a block diagram. Although a flowchart may describe operations as a sequential process, many of the operations can be performed in parallel or at least partially concurrently. In addition, the order of the operations can be rearranged. A process is terminated when its operations are completed. A process can correspond to a method, a function, a procedure, a subroutine, a subprogram, etc. When a process corresponds to a function, its termination corresponds to a return of the function to the calling function or the main function.

Moreover, storage may represent one or more devices that store data, including but not limited to random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a flash memory device, and/or other computer-readable or processor-readable media to store information. As used herein, a computer-readable or processor-readable storage medium/device is not a signal.

Furthermore, aspects can be implemented by hardware, software, firmware, middleware, microcode, or any combination thereof. When implemented in software, firmware, middleware or microcode, program code or code segments to perform the tasks can be stored in a memory or other storage. One or more than one processor can perform tasks in series, distributed, concurrently, or in parallel. In some examples, a virtual computer system can be constructed to implement one or more of the methods or functionality as described herein. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, etc.

Although the present disclosure has been described with a degree of particularity, it is understood that the present disclosure has been made by way of example and that other versions are possible. As various changes could be made in the above description without departing from the scope of the disclosure, it is intended that all matter contained in the above description or shown in the accompanying drawings shall be illustrative and not used in a limiting sense.

All features disclosed in the specification, including the claims, abstract, and drawings, and all the steps in any method or process disclosed, can be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise.

Thus, unless expressly stated otherwise, each feature disclosed is one example only of a generic series of equivalent or similar features. The above-disclosed subject matter is to be considered illustrative, and not restrictive, and the appended claims are intended to cover all such modifications, enhancements, and other aspects, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing description.

What is claimed is:

1. An apparatus comprising:
   a network interface configured to receive a first user input from a client device and a second user input, the first user input being text input defining a first search query and the second user input indicating a second search query; and
   a processor configured to:
      identify one or more first keywords by parsing the first search query;
      after identifying the one or more first keywords, select a first design template based on specific keywords of the one or more first keywords;
      after identifying the one or more first keywords, select first design content based on the specific keywords of the one or more first keywords, the first design content including at least one first image;
      after selecting first design template, generate a first design based on the first design template, wherein generating the first design includes, based on determining that the first design template includes a first design element having a first content role, adding a second design element having the first content role to the first design;

after generating the first design and before presenting the first design to the client device, generate a first updated version of the first design based on the first design content;

after generating the first updated version of the first design, generate a first graphical user interface (GUI) including a first design image of the first updated version of the first design;

after generating the first GUI, provide the first GUI via the network interface to the client device;

identify one or more second keywords by parsing the second search query;

select a second design template based on the one or more second keywords;

generate a second updated version of the first design by applying the second design template to the first design;

generate a second GUI that includes a second design image of the second updated version of the first design; and provide the second GUI to the client device, wherein generating the second updated version of the first design by applying the second design template to the first design includes:

generating a content signature of the first design, the content signature indicating that the second design element of the first design has the first content role;

generating a second design based on the second design template, wherein generating the second design includes, based on determining that the second design template includes a third design element having the first content role, adding a fourth design element having the first content role to the second design;

updating the second design by applying the content signature to the second design, wherein applying the content signature to the second design includes transferring content from the second design element to the fourth design element; and designating the second design as the second updated version of the first design.

2. The apparatus of claim 1, wherein the network interface is further configured to receive a selection of the first design image, wherein the processor is further configured to:

in response to receiving the selection of the first design image, generate a third GUI that includes one or more options to edit the first updated version of the first design; and provide the third GUI via the network interface to the client device.

3. The apparatus of claim 2, wherein the processor is further configured to, in response to receiving a selection of a save option of the third GUI, update search selection data to indicate that the first updated version of the first design is saved by a user and that the first updated version of the first design is based on the first search query, the first design template, and the first design content.

4. The apparatus of claim 1, wherein the processor is further configured to select the first design template based at least in part on determining that a tag of the first design template matches at least one of the one or more first keywords.

5. The apparatus of claim 1, wherein the processor is further configured to select the first design content based at least in part on determining that a tag of the first design content matches at least one of the one or more first keywords.

6. The apparatus of claim 1, wherein the processor is further configured to:

identify a first plurality of design templates based on the one or more first keywords; and determine scores of the first plurality of design templates, the scores including a first score of the first design template, wherein the first design template is selected based at least in part on determining that the first score satisfies a score threshold.

7. The apparatus of claim 6, wherein the processor is further configured to determine the first score based on a count of the one or more first keywords that match at least one tag of the first design template.

8. The apparatus of claim 6, wherein the processor is further configured to:

retrieve search selection data indicating that a third design was saved by a user at a first time and that the third design is based on a third search query and the first design template; and determine, at a second time, the first score based on a comparison of the first time and the second time, a comparison of the first search query and the third search query, a comparison of first user characteristics of the user and second user characteristics of a logged-in user, or a combination thereof.

9. The apparatus of claim 1, wherein the processor is further configured to:

select a third design template based on the one or more first keywords;

select second design content based on the one or more first keywords;

generate a third design based on the third design template; and generate an updated version of the third design based on the second design content, wherein the first GUI includes a third design image of the updated version of the third design.

10. The apparatus of claim 1, wherein the network interface is further configured to receive third user input indicating a third search query, and wherein the processor is further configured to:

identify one or more third keywords by parsing the third search query;

select second design content based on the one or more third keywords;

generate a third updated version of the first design based on the second design content;

generate a third GUI that includes a third design image of the third updated version of the first design; and provide the third GUI to the client device.

11. The apparatus of claim 10, wherein the second design content includes at least one of a second font, a second fill, or a second image, and wherein generating the third updated version of the first design based on the second design content includes replacing at least one of a first font, a first fill, or the first image in the first design with a corresponding one of the second font, the second fill, or the second image.

12. A method comprising:

receiving, at a first device from a second device, a first user input being text input defining a first search query and a second user input indicating a second search query;

identifying, at the first device, one or more first keywords by parsing the first search query;
after identifying the one or more first keywords, selecting, at the first device, a first design template based on specific keywords of the one or more first keywords;
after identifying the one or more first keywords, selecting, at the first device, first design content based on the specific keywords of the one or more first keywords, the first design content including at least one first image;
after selecting the first design template, generating, at the first device, a first design based on the first design template, wherein generating the first design includes, based on determining that the first design template includes a first design element having a first content role, adding a second design element having the first content role to the first design;
after generating the first design and before presenting the first design to the second device, generating, at the first device, a first updated version of the first design based on the first design content;
generating, at the first device, a first graphical user interface (GUI) including a first design image of the first updated version of the first design;
providing the first GUI from the first device to the second device;
identifying one or more second keywords by parsing the second search query;
selecting a second design template based on the one or more second keywords;
generating a second updated version of the first design by applying the second design template to the first design;
generating a second GUI that includes a second design image of the second updated version of the first design; and
providing the second GUI to the client device,
wherein generating the second updated version of the first design by applying the second design template to the first design includes:
generating a content signature of the first design, the content signature indicating that the second design element of the first design has the first content role;
generating a second design based on the second design template, wherein the generating the second design includes, based on determining that the second design template includes a third design element having the first content role, adding a fourth design element having the first content role to the second design;
updating the second design by applying the content signature to the second design, wherein applying the content signature to the second design includes transferring content from the second design element to the fourth design element; and
designating the second design as the second updated version of the first design.

13. The method of claim 12, further comprising:
receiving, at the first device from the second device, a selection of the first design image;
in response to receiving the selection of the first design image, generating a third GUI that includes one or more options to edit the first updated version of the first design; and
providing the third GUI from the first device to the second device.

14. The method of claim 12, further comprising selecting the first design template based at least in part on determining that a tag of the first design template matches at least one of the one or more first keywords.

15. The method of claim 12, further comprising:
identifying, at the first device, a first plurality of design templates based on the one or more first keywords; and
determining scores of the first plurality of design templates, the scores including a first score of the first design template,
wherein the first design template is selected based at least in part on determining that the first score satisfies a score threshold.

16. A computer-readable storage device storing instructions that, when executed by a processor cause the processor to perform operations comprising:
receiving a first user input being text input defining a first search query and a second user input indicating a second search query;
identifying one or more first keywords by parsing the first search query;
after identifying the one or more first keywords, selecting a first design template based on specific keywords of the one or more first keywords;
after identifying the one or more first keywords, selecting first design content based on the specific keywords of the one or more first keywords, the first design content including at least one first image;
after selecting first design template, generating a first design based on the first design template, wherein generating the first design includes, based on determining that the first design template includes a first design element having a first content role, adding a second design element having the first content role to the first design;
after generating the first design and before presenting the first design to a client device, generating a first updated version of the first design based on the first design content;
after generating a first updated version of the first design, generating a first graphical user interface (GUI) including a first image of the first updated version of the first design;
after generating the first GUI, providing the first GUI to a client device;
identifying one or more second keywords by parsing the second search query;
selecting a second design template based on the one or more second keywords;
generating a second updated version of the first design by applying the second design template to the first design;
generating a second GUI that includes a second design image of the second updated version of the first design; and
providing the second GUI to the client device;
wherein generating the second updated version of the first design by applying the second design template to the first design includes:
generating a content signature of the first design, the content signature indicating that the second design element of the first design has the first content role;
generating a second design based on the second design template, wherein the generating the second design includes, based on determining that the second design template includes a third design element having the first content role. adding a fourth design element having the first content role to the second design;

updating the second design by applying the content signature to the second design, wherein applying the content signature to the second design includes transferring content from the second design element to the fourth design element; and designating the second design as the second updated version of the first design.

17. The computer-readable storage device of claim 16, wherein the operations further comprise:

selecting a third design template based on the one or more first keywords;

selecting second design content based on the one or more first keywords;

generating a third design based on the third design template; and generating an updated version of the third design based on the second design content, wherein the first GUI includes a third design image of the updated version of the third design.

18. The computer-readable storage device of claim 16, wherein the operations further comprise:

receiving third user input indicating a third search query;

identifying one or more third keywords by parsing the third search query;

selecting second design content based on the one or more third keywords;

generating a third updated version of the first design based on the second design content;

generating a third GUI that includes a third design image of the third updated version of the first design; and providing the third GUI to the client device.

* * * * *